United States Patent
Mori et al.

(10) Patent No.: US 8,228,268 B2
(45) Date of Patent: *Jul. 24, 2012

(54) DISPLAY DEVICE, METHOD OF DRIVING DISPLAY DEVICE, AND COMPUTER PROGRAM

(75) Inventors: Hideto Mori, Tokyo (JP); Ken Kikuchi, Tokyo (JP); Yasuo Inoue, Tokyo (JP); Takeya Meguro, Tokyo (JP); Hidehiko Shidara, Tokyo (JP); Masahiro Ito, Kanagawa (JP); Toyo Osumi, Tokyo (JP)

(73) Assignee: Sony Corporation, Tokyo (JP)

( * ) Notice: Subject to any disclaimer, the term of this patent is extended or adjusted under 35 U.S.C. 154(b) by 468 days.

This patent is subject to a terminal disclaimer.

(21) Appl. No.: 12/595,246

(22) PCT Filed: May 15, 2008

(86) PCT No.: PCT/JP2008/058935
§ 371 (c)(1),
(2), (4) Date: Oct. 9, 2009

(87) PCT Pub. No.: WO2008/143130
PCT Pub. Date: Nov. 27, 2008

(65) Prior Publication Data
US 2010/0118062 A1 May 13, 2010

(30) Foreign Application Priority Data
May 18, 2007 (JP) ................ 2007-133229

(51) Int. Cl.
*G09G 3/30* (2006.01)
(52) U.S. Cl. ............. 345/77; 345/690; 345/204; 345/83
(58) Field of Classification Search .............. 345/76–83, 345/204, 207, 690–691; 315/169.3; 313/463; 348/223.1; 382/162, 167
See application file for complete search history.

(56) References Cited

U.S. PATENT DOCUMENTS
6,947,080 B2 * 9/2005 Ikeda .................. 348/223.1
(Continued)

FOREIGN PATENT DOCUMENTS
EP 1 391 865 A1 2/2004
(Continued)

OTHER PUBLICATIONS
Supplementary European Search Report issued Feb. 10, 2012 in European Application No. 08764298.9-2205/2148316.
Office Action issued Feb. 22, 2012 in European Application No. 08 764 298.9-2205.

*Primary Examiner* — Lun-Yi Lao
*Assistant Examiner* — Md Saiful A Siddiqui
(74) *Attorney, Agent, or Firm* — Oblon, Spivak, McClelland, Maier & Neustadt, L.L.P.

(57) ABSTRACT

There is provided a display device including a display unit having pixels, each of which includes a luminescence element for individually emitting light depending on a current amount and a pixel circuit for controlling a current applied to the luminescence element according to a picture signal, scan lines which supply a selection signal for selecting the pixels to emit light to the pixels in a predetermined scanning cycle, and data lines which supply the picture signal to the pixels, the pixels, the scan lines, and the data lines arranged in a matrix pattern, the display device including: a luminescence amount detector for inputting a picture signal with a linear characteristic to detect a luminescence amount from the picture signal; a luminescence time calculator for calculating a luminescence time for the luminescence element based on the luminescence amount detected by the luminescence amount detector; a luminescence time recorder for recording the calculated luminescence time; a luminance acquirer for acquiring luminance information of the luminescence element by use of the luminescence time recorded in the luminescence time recorder; a coefficient calculator for calculating a coefficient by which the picture signal is multiplied, based on the luminance information acquired by the luminance acquirer; and a coefficient multiplier for multiplying the picture signal by the coefficient calculated by the coefficient calculator.

11 Claims, 27 Drawing Sheets

U.S. PATENT DOCUMENTS

| | | |
|---|---|---|
| 2003/0063053 A1 | 4/2003 | Yamazaki et al. |
| 2003/0090488 A1 | 5/2003 | Yoo |
| 2005/0052369 A1 | 3/2005 | Tada |
| 2005/0285828 A1 | 12/2005 | Inoue et al. |
| 2007/0097038 A1 | 5/2007 | Yamazaki et al. |
| 2007/0200803 A1 * | 8/2007 | Kimura .......................... 345/76 |

FOREIGN PATENT DOCUMENTS

| | | |
|---|---|---|
| JP | 2003 177713 | 6/2003 |
| JP | 2005 84353 | 3/2005 |
| JP | 2006 163069 | 6/2006 |

* cited by examiner

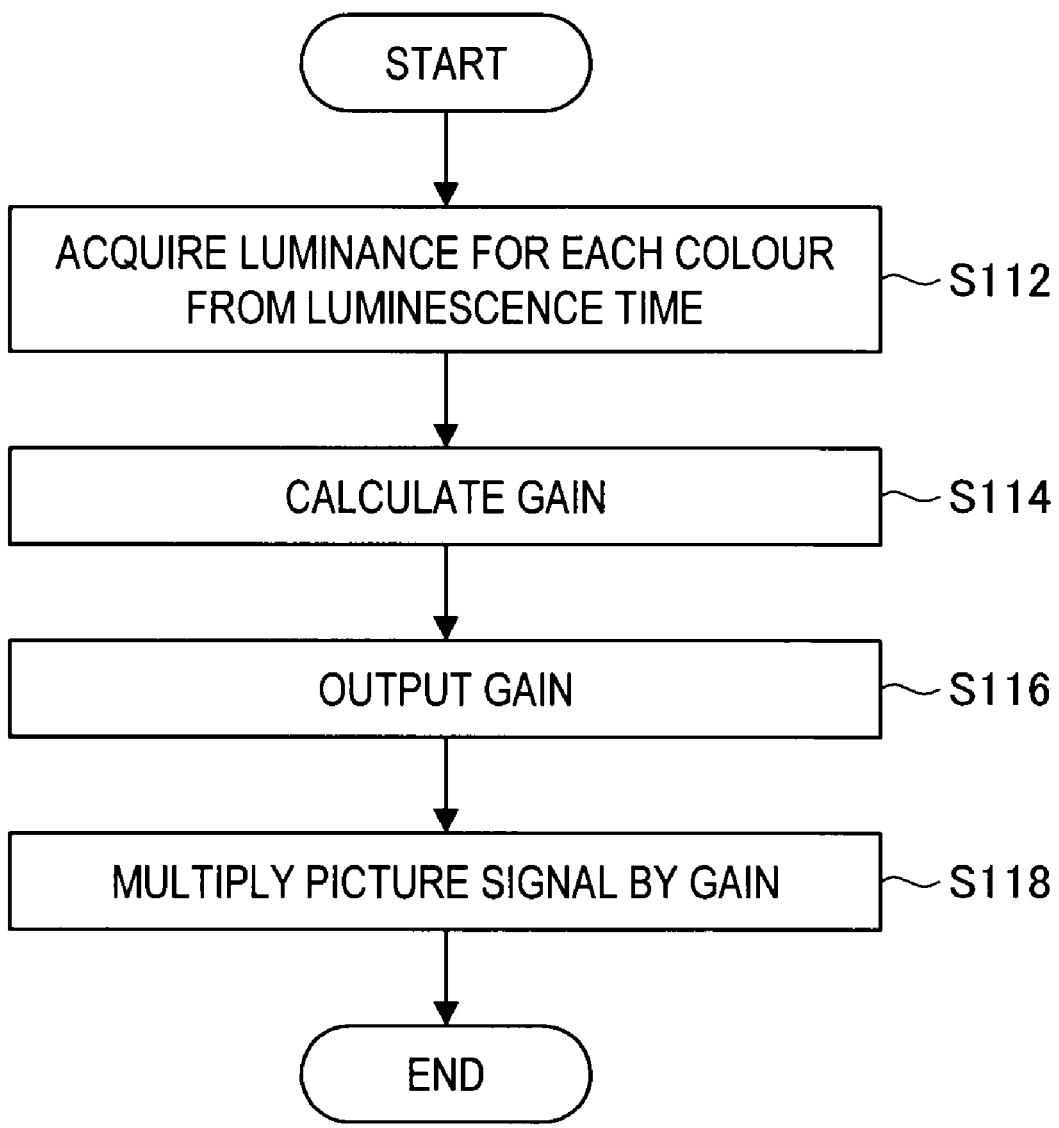

IF PICTURES ARE DISPLAYED IN 4:3 FOR 50% OF VIEWING TIME, THIS PART WILL BE PARTICULARLY DETERIORATED.

DISPLAY DEVICE, METHOD OF DRIVING DISPLAY DEVICE, AND COMPUTER PROGRAM

TECHNICAL FIELD

The present invention relates to a display device and a method of controlling display device, and more particularly, to an active matrix type display device configured to have scan lines for selecting pixels in a predetermined scanning cycle, data lines for giving luminance information for driving the pixels, and pixel circuits for controlling a current amount based on the luminance information and allowing luminescence elements to emit light depending on the current amount, which are arranged in a matrix pattern, and to a method of driving the same.

BACKGROUND ART

For flat and thin display devices, liquid-crystal display devices using liquid crystal, and plasma display devices using plasma have been practically used.

A liquid-crystal display device is a display device with backlight for displaying an image by changing the arrangement of liquid crystal molecules by applying voltage to transmit or intercept light from the backlight. And, a plasma display device is a display device for displaying an image by applying voltage to gas enclosed in a substrate to induce plasma state, so that ultraviolet rays generated by energy due to the return from the plasma state to the original state are irradiated to a fluorescence substance so as to obtain visible light.

On the other hand, in recent years, the development of self-luminescence type display devices using organic EL (electroluminescence) elements which themselves emit light when voltage is applied is in progress. When an organic EL element receives energy by electrolysis, its state is changed from the ground state into an excited state, and when the state returns from the excited state to the ground state, differential energy is emitted as light. An organic EL display device is a device for displaying an image by use of the light emitted from such organic EL elements.

Self-luminescence display devices can be configured to be thinner than liquid crystal display devices, because self-luminescence display devices do not need backlight, differently from liquid crystal display devices which need backlight, for the elements themselves emit light. And, because the moving image characteristic, the view angle characteristic, and the colour reproducibility of a self-luminescence display device are superior to those of a liquid crystal display, self-luminescence display devices using organic EL elements attract attention as a next-generation flat thin display device.

Patent Document 1: JP 2005-084353 (A)

DISCLOSURE OF THE INVENTION

Object to be Achieved by the Invention

However, since the elements of a self-luminescence display device themselves emit light, the luminescence elements deteriorates if they continue emitting light. The luminescence elements have respective different deterioration characteristics for each colour of the three primary colours: red; green; and blue. Therefore, luminescence balance amongst three colours, red, green and blue, is disrupted as the luminescence elements deteriorate, and as a result, there has been an issue that a picture is displayed with colour temperature different from desired one.

Then, the present invention is made in view of the above-mentioned issue, and aims to provide a display device, a method of driving the display device, and a computer program, which are novel and improved, and which are capable of calculating luminescence time from a picture signal and obtaining the luminance of a luminescence element based on the calculated luminescence time, and adjusting colour temperature based on the obtained luminance information.

Solution for Achieving the Object

According to an aspect of the present invention in order to achieving the above-mentioned object, there is provided a display device including a display unit having pixels, each of which includes a luminescence element for individually emitting light depending on a current amount and a pixel circuit for controlling a current applied to the luminescence element according to a picture signal, scan lines which supply a selection signal for selecting the pixels to emit light to the pixels in a predetermined scanning cycle, and data lines which supply the picture signal to the pixels, the pixels, the scan lines, and the data lines arranged in a matrix pattern, the display device including: a luminescence amount detector for inputting a picture signal with a linear characteristic to detect a luminescence amount from the picture signal; a luminescence time calculator for calculating a luminescence time for the luminescence element based on the luminescence amount detected by the luminescence amount detector; a luminescence time recorder for recording the calculated luminescence time; a luminance acquirer for acquiring luminance information of the luminescence element by use of the luminescence time recorded in the luminescence time recorder; a coefficient calculator for calculating a coefficient by which the picture signal is multiplied, based on the luminance information acquired by the luminance acquirer; and a coefficient multiplier for multiplying the picture signal by the coefficient calculated by the coefficient calculator.

According to such a configuration, a luminescence amount detector inputs a picture signal with a linear characteristic to detect a luminescence amount from the picture signal, a luminescence time calculator calculates a luminescence time for the luminescence element based on the luminescence amount detected by the luminescence amount detector, a luminescence time recorder records the calculated luminescence time, a luminance acquirer acquires luminance information of the luminescence element by use of the luminescence time recorded in the luminescence time recorder, a coefficient calculator calculates a coefficient by which the picture signal is multiplied, based on the luminance information acquired by the luminance acquirer, and a coefficient multiplier multiplies the picture signal by the coefficient calculated by the coefficient calculator. As a result, a luminescence time is calculated from a picture signal, luminance of a luminescence element is acquired from the calculated luminescence time, and a coefficient is calculated based on information on the acquired luminance. Then, adjustment on colour temperature of a picture to be displayed on a screen can be executed by multiplying the picture signal by the calculated coefficient.

The display device may further include a linear converter for converting a picture signal with a gamma characteristic into a picture signal with a linear characteristic. According to such a configuration, a linear converter converts a picture signal with a gamma characteristic into a picture signal with a linear characteristic. The picture signal with a linear characteristic converted by the linear converter is input to the luminescence amount detector, and a luminescence amount is detected from the picture signal. As a result, each of the various signal processes can be readily executed.

The display device may further include a gamma converter for converting an output signal with a linear characteristic from the coefficient multiplier to be with a gamma characteristic. According to such a configuration, a gamma converter converts an output signal with a linear characteristic from the coefficient multiplier to be with a gamma characteristic. As a result, because the picture signal has the gamma characteristic, the display can cancel its gamma characteristic, and have a linear characteristic, so that a self-luminescence element inside a display unit become luminous depending on a current of the signal.

The coefficient calculator may calculate a coefficient for adjusting, to luminance of a colour at lowest luminance, luminance of other colours, as a result of acquiring the luminance information by the luminance acquirer. According to such a configuration, a coefficient calculator calculates a coefficient for adjusting, to luminance of a colour at lowest luminance, luminance of other colours, as a result of acquiring the luminance information by a luminance acquirer. As a result, a picture is displayed with luminance lowered by adjusting the luminance of the rest of the colours to the luminance of the colour at the lowest luminance so that the deterioration speed of a self-luminescence element can be slowed.

The luminescence amount detector may detect luminescence amounts for a plurality of regions on a screen, and a signal level calculator may adjust a luminescence amount adapting to an area with most lowered luminance. According to such a configuration, a luminescence amount detector detects luminescence amounts for a plurality of areas on a screen, and a signal level calculator adjusts a luminescence amount adapting to an area with most lowered luminance. As a result, the luminance of the whole screen is adapted to that of the area with the most lowered luminance, so that the colour temperature of the whole screen can be uniformed.

For the plurality of areas, the luminescence amount detector moves the areas up and down on a screen to detect a luminescence amount. According to such a configuration, in a case of detecting a luminescence amount, for the plurality of areas, the luminescence amount detector moves the areas up and down on a screen to detect a luminescence amount. As a result, the luminance on the screen can be detected thoroughly, and more advantageous adjustment on colour temperature can be executed.

Also, according to another aspect of the present invention in order to solve the above-mentioned object, there is provided a method of driving a display device including a display unit having pixels, each of which includes a luminescence element for individually emitting light depending on a current amount and a pixel circuit for controlling a current applied to the luminescence element according to a picture signal, scan lines which supply a selection signal for selecting the pixels to emit light to the pixels in a predetermined scanning cycle, and data lines which supply the picture signal to the pixels, the pixels, the scan lines, and the data lines arranged in a matrix pattern, the method of driving the display device, including: a luminescence amount detecting step of inputting a picture signal with a linear characteristic to detect a luminescence amount from the picture signal; a luminescence time calculating step of calculating a luminescence time for the luminescence element based on the luminescence amount detected in the luminescence amount detecting step; a luminescence time recording step of recording the calculated luminescence time; a luminance acquiring step of acquiring luminance information of the luminescence element by use of the luminescence time recorded in the luminescence time recording step; a coefficient calculating step of calculating a coefficient by which the picture signal is multiplied, based on the luminance information acquired in the luminance acquiring step; and a coefficient multiplying step of multiplying the picture signal by the coefficient calculated in the coefficient calculating step.

According to such a configuration, a luminescence amount detecting step inputs a picture signal with a linear characteristic to detect a luminescence amount from the picture signal, a luminescence time calculating step calculates a luminescence time for the luminescence element based on the luminescence amount detected in the luminescence amount detecting step, a luminescence time recording step records the calculated luminescence time, a luminance acquiring step acquires luminance information of the luminescence element by use of the luminescence time recorded in the luminescence time recording step, a coefficient calculating step calculates a coefficient by which the picture signal is multiplied, based on the luminance information acquired in the luminance acquiring step, and a coefficient multiplying step multiples the picture signal by the coefficient calculated in the coefficient calculating step. As a result, a luminescence time is calculated from a picture signal, luminance of a luminescence element is acquired from the calculated luminescence time, and a coefficient is calculated based on information on the acquired luminance. Then, adjustment on colour temperature of a picture to be displayed on a screen can be executed by multiplying the picture signal by the calculated coefficient.

Also, according to another aspect of the present invention in order to achieve the above-mentioned object, there is provided a computer program for causing a computer to execute control over a display device including a display unit having pixels, each of which includes a luminescence element for individually emitting light depending on a current amount and a pixel circuit for controlling a current applied to the luminescence element according to a picture signal, scan lines which supply a selection signal for selecting the pixels to emit light to the pixels in a predetermined scanning cycle, and data lines which supply the picture signal to the pixels, the pixels, the scan lines, and the data lines arranged in a matrix pattern, the computer program including: a luminescence amount detecting step of inputting a picture signal with a linear characteristic to detect a luminescence amount from the picture signal; a luminescence time calculating step of calculating a luminescence time for the luminescence element based on the luminescence amount detected in the luminescence amount detecting step; a luminescence time recording step of recording the calculated luminescence time; a luminance acquiring step of acquiring luminance information of the luminescence element by use of the luminescence time recorded in the luminescence time recording step; a coefficient calculating step of calculating a coefficient by which the picture signal is multiplied, based on the luminance information acquired in the luminance acquiring step; and a coefficient multiplying step of multiplying the picture signal by the coefficient calculated in the coefficient calculating step.

According to such a configuration, a luminescence amount detecting step inputs a picture signal with a linear characteristic to detect a luminescence amount from the picture signal, a luminescence time calculating step calculates a luminescence time for the luminescence element based on the luminescence amount detected in the luminescence amount detecting step, a luminescence time recording step records the calculated luminescence time, a luminance acquiring step acquires luminance information of the luminescence element by use of the luminescence time recorded in the luminescence time recording step, a coefficient calculating step calculates a coefficient by which the picture signal is multiplied, based on the luminance information acquired in the luminance acquiring step, and a coefficient multiplying step multiples the picture signal by the coefficient calculated in the coefficient calculating step. As a result, a luminescence time is calculated from a picture signal, luminance of a luminescence element is acquired from the calculated luminescence time, and a coefficient is calculated based on information on the acquired luminance. Then, adjustment on colour temperature of a picture to be displayed on a screen can be executed by multiplying the picture signal by the calculated coefficient.

According to the present invention as described above, it is possible to provide a display device, a method of driving the display device, and a computer program, which are novel and improved, and which are capable of calculating luminescence time from a picture signal and obtaining the luminance of a luminescence element based on the calculated luminescence time, and adjusting colour temperature based on the obtained luminance information.

BRIEF DESCRIPTION OF THE DRAWINGS

FIG. 18 is a flow diagram that illustrates a colour temperature adjusting method according to an embodiment of the present invention.

Figure 1:
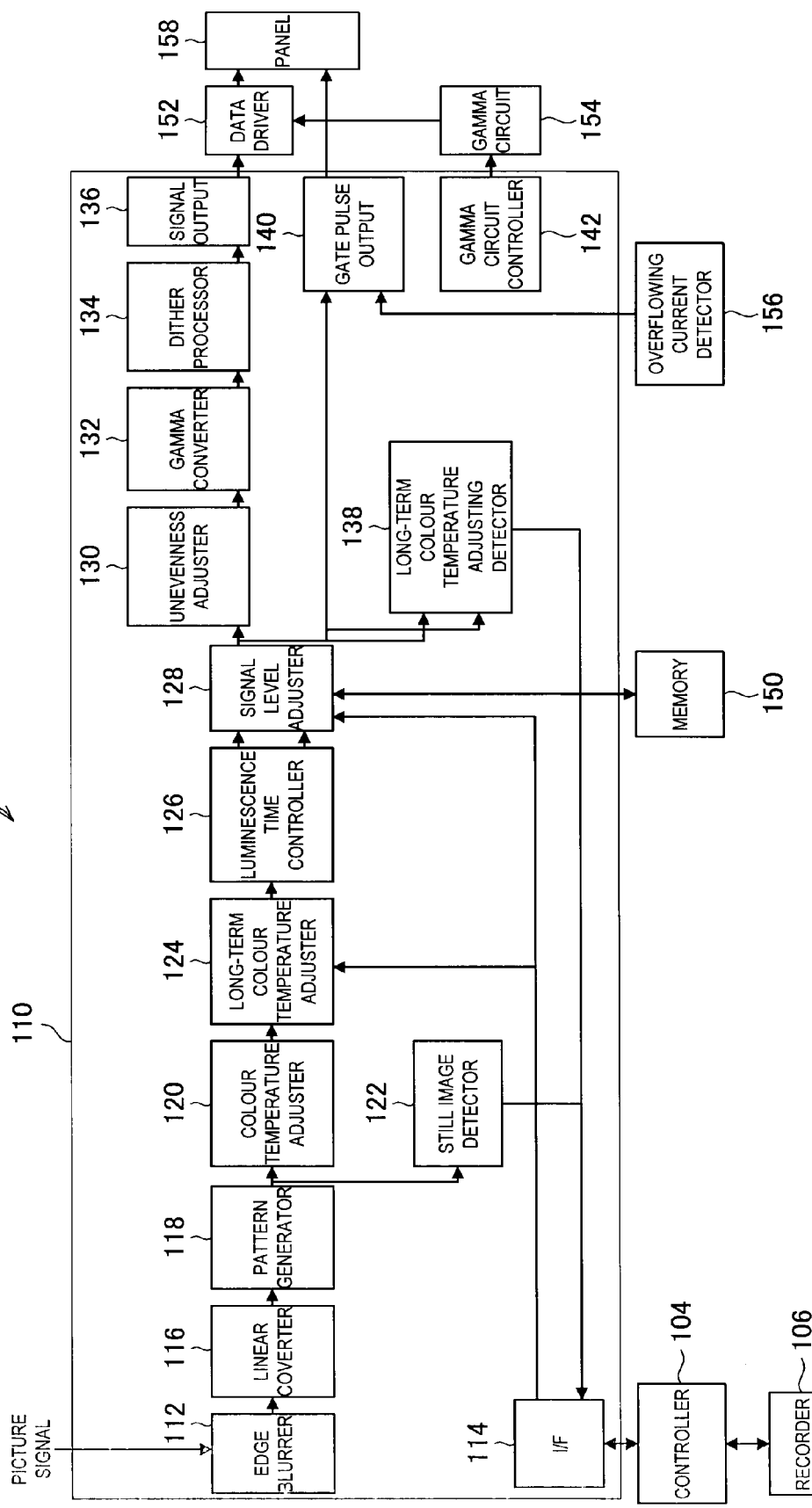
FIG. 1 is an illustration that illustrates the configuration of the display device 100 according to an embodiment of the present invention.

Explanation of Reference Numerals 100 display device
104 controller
106 recorder
110 signal processing integrated circuit
112 edge blurrer 114 I/F
116 linear converter
118 pattern generator
120 colour temperature adjuster
122 still image detector
124 long-term colour temperature adjuster
126 luminescence time controller
128 signal level adjuster
130 unevenness adjuster
132 gamma converter
134 dither processor
136 signal output
138 long-term colour temperature adjusting detector
140 gate pulse output
142 gamma circuit controller
150 memory
152 data driver
154 gamma circuit
156 overflowing current detector
158 panel
162 luminescence time calculator
164 luminescence time memory
166 luminance acquirer
168 coefficient calculator
170 coefficient multiplier

BEST MODE FOR CARRYING OUT THE INVENTION

Hereinafter, preferred embodiments of the present invention will be described in detail with reference to the appended drawings. Note that, in this specification and the drawings, elements that have substantially the same function and structure are denoted with the same reference numerals, and repeated explanation is omitted.

First, the configuration of a display device according to an embodiment of the present invention will be described. FIG. 1 is an illustration that illustrates a configuration of a display device 100 according to an embodiment of the present invention. In the following, the configuration of the display device 100 according to an embodiment of the present invention will be described with reference to FIG. 1.

As shown in FIG. 1, the display device 100 according to an embodiment of the present invention includes a controller 104, a recorder 106, a signal processing integrated circuit 110, a memory 150, a data driver 152, a gamma circuit 154, an overflowing current detector 156, and a panel 158.

The signal processing integrated circuit 110 includes an edge blurrer 112, an I/F 114, a linear converter 116, a pattern generator 118, a colour temperature adjuster 120, a still image detector 122, a long-term colour temperature adjuster 124, a luminescence time controller 126, a signal level adjuster 128, an unevenness adjuster 130, a gamma converter 132, a dither processor 134, a signal output 136, a long-term colour temperature adjusting detector 138, a gate pulse output 140, and a gamma circuit controller 142.

When the display device is supplied with a picture signal, it analyses the picture signal, and turns on pixels arranged in the panel 158, which will be described later, according to the contents of the analysis, so as to display a picture via the panel 158.

The controller 104 controls the signal processing integrated circuit 110 and sends/receives signals to/from the I/F 114. The controller 104 executes various signal processes in correspondence to signals received from the I/F 114. The signal processes executed by the controller 104 include, for example, calculation of a gain to be used for adjusting luminance of an image to be displayed on the panel 158.

The recorder 106 is for storing information for controlling the signal processing integrated circuit 110 by the controller 104. A memory which enables keeping the stored information remaining even when the display device 100 is powered off is preferably used for the recorder 106. An EEPROM (Electronically Erasable and Programmable Read Only Memory), which allows rewriting the contents electrically, is desirably used for a memory to be adopted as the recorder 106. An EEPROM is a non volatile memory which allows writing and removing data, remaining packaged on a substrate, and is a preferable memory for storing information on the display device 100, the information changing every moment.

The signal processing integrated circuit 110 inputs a picture signal and executes signal processes on the input picture signal. In this embodiment, the picture signal input into the signal processing integrated circuit 110 is a digital signal, and its signal width is 10 bits. The signal processes on the input picture signal are executed by the respective sections inside the signal processing integrated circuit 110.

The edge blurrer 112 executes on the input picture signal a signal process for blurring an edge. Specifically, the edge blurrer 112 prevents a sticking phenomenon of an image onto the panel 158 by intentionally shifting the image and blurring its edge.

The linear converter 116 executes a signal process for converting the picture signal, which is output with a gamma characteristic for itself input, to have a linear characteristic. The signal process is executed to make the output for the input to be with a linear characteristic, so that various processes on images to be displayed on the panel 158 become easy. The signal process by the linear converter 116 widens the signal width of the picture signal from 10 bits to 14 bits. Upon conversion of the picture signal to have a linear characteristic by the linear converting section 116, the gamma converter 132, which will be described later, converts the picture signal with a linear characteristic to have a gamma characteristic.

The pattern generator 118 generates test patterns to be used in the image processes within the display device 100. The test patterns to be used in the image processes within the display device 100 include, for example, a test pattern which is used for display check for the panel 158.

The colour temperature adjuster 120 adjusts the colour temperature of images, and adjusts colours to be displayed on the panel 158 of the display device 100. The display device 100 includes a colour temperature adjusting means, not shown in FIG. 1, for adjusting colour temperature, and enables adjusting manually the colour temperature of images to be displayed on a screen by a user operating the colour temperature adjusting means.

The long-term colour temperature adjuster 124 adjusts aging-related deterioration due to variation in the luminance-time characteristic (LT characteristic) of each colour of R (red), G (green), and B (blue) of an organic EL elements. Since organic EL elements have different LT characteristics for each colour of R, G, and B, colour balance will be deteriorated over luminescence time. It adjusts such colour balance.

The luminescence time controller 126 calculates a duty ratio of pulses at the time of displaying a picture on the panel 158, and controls the luminescence time of organic EL elements. The display device 100 makes the organic EL elements luminous to display an image by flowing a current to the organic EL elements inside the panel 158 during HI state of pulses.

In order to prevent an image sticking phenomenon, the signal level adjuster 128 adjusts the luminance of a picture to be displayed on the panel 158 by adjusting the signal level of the picture signal. The image sticking phenomenon is a deterioration phenomenon of luminescence characteristics which occurs in the case where frequency of a particular pixel to be luminous is higher than that of the other pixels. A deteriorated pixel results in lowered luminescence in comparison with the other non-deteriorated pixels, and in a large difference in luminance to the surrounding non-deteriorated pixels. Letters will be seems to be sticking onto the screen due to such a difference in luminance.

The signal level adjuster 128 calculates luminescence amount for each pixel or a pixel group, based on the picture signal and the duty ratio of pulses calculated by the luminescence time controller 126, calculates a gain for reducing the luminance, if necessary, based on the calculated luminescence amount, and multiplies the picture signal by the calculated gain.

The long-term colour temperature adjusting detector 138 detects information for adjusting by the long-term colour temperature adjuster 124. The information detected by the long-term colour temperature adjusting detector 138 is sent to the controller 140 through the I/F 114 to be recorded onto the recorder 106 via the controller 104.

The unevenness adjuster 130 adjusts the unevenness of images and pictures displayed on the panel 158. The unevenness adjuster 130 adjusts lateral stripes and longitudinal stripes on the panel 158 and unevenness of the entire screen based on the level of an input signal and a coordinate position.

The gamma converter 132 executes a signal process for converting the picture signal, which has been converted to have a linear characteristic by the linear converter 116, to have a gamma characteristic. The signal process executed in the gamma converter 132 is a signal process for cancelling the gamma characteristic of the panel 158 and converting into a signal with a linear characteristic so that the organic EL elements in the panel 158 become luminous depending on the current of the signal. The signal width changes from 14 bits into 12 bits by the gamma converter 132 executing the signal process.

The dither processor 134 performs dithering on the signal converted by the gamma converter 132. The dithering is to display with displayable colours combined in order to represent medium colours in an environment where the number of available colours is small. Colours which can not be normally displayed on the panel can be seemingly represented, produced by performing dithering by the dither processor 134. The signal width is changed from 12 bits into 10 bits by dithering by the dither processor 134.

The signal output 136 outputs to the data driver 152 the signal on which is performed dithering by the dither processor 134. The signal passed from the signal output 136 to the data driver 152 is a signal that carries information on a luminescence amount for each colour of R, G, and B. The signal that carries information on a luminescence time is output in the form of a pulse from the gate pulse output 140.

The gate pulse output 140 outputs a pulse for controlling the luminescence time of the panel 158. The pulse output from the gate pulse output 140 is a pulse depending on the duty ratio calculated by the luminescence time controller 126. The luminescence time for each pixel in the panel 158 is determined according to the pulse from the gate pulse output 140.

The gamma circuit controller 142 gives a setting value to the gamma circuit 154. The setting value given from the gamma circuit controller 142 is a reference voltage to be given to a ladder resistance of a D/A converter included within the data driver 152.

The memory 150 is for storing information on luminous pixels or a luminous pixel group at luminance above predetermined luminance and information on the exceeding amount, associating both of the information, which is necessary for adjusting luminance by the signal level adjuster 128. For the memory 150, a memory from which contents will be removed upon powered off may be used, and for example, an SDRAM (Synchronous Dynamic Random Access Memory) is desirably used as such a memory.

When an overflowing current is generated due to a short circuit on a substrate, the overflowing current detector 156 detects the overflowing current, and informs the gate pulse output 140 of it. Informing of overflowing current generation by the overflowing current detector 156 can prevent an overflowing current, if generated, from being applied to the panel 158.

The data driver 152 executes a signal process on the signal received from the signal output 136, and outputs to the panel 158 a signal for displaying a picture on the panel 158. The data driver 152 includes a D/A converter, which is not shown. The D/A converter converts a digital signal into an analogue signal, and outputs it.

The gamma circuit 154 gives a reference voltage to the ladder resistance of the D/A converter included in the data driver 152. The reference voltage to be given to the ladder resistance is generated by the gamma circuit controller 142, as described above.

The panel 158 inputs an output signal from the data driver 152 and an output pulse from the gate pulse output 140, and allows organic EL elements, which are one example of self-luminescence elements, to be luminous for displaying moving images and still images, according to the input signal and pulse. The panel 158 has a flat-shaped surface for displaying images. The organic EL elements are self-luminescence elements which become luminous when a voltage is applied, and their luminescence amounts are proportional to the voltage. Therefore, an IL characteristic (current to luminescence amount characteristic) of an organic EL element also has a proportional relation.

In the panel 158, scan lines, data lines and pixel circuits, which are not shown, are arranged into a matrix pattern. The scan lines are for selecting pixels in a predetermined scanning cycle. The data lines are for giving luminance information for driving the pixels. The pixel circuits control a current amount based on the luminance information, and allow organic EL elements, which are luminescence elements, to become luminous depending on the current amount. By such configuration of the scan lines, the data line and the pixel circuits, the display device 100 can display pictures according to the picture signals.

In the above, the configuration of the display device 100 according to an embodiment of the present invention with reference to FIG. 1 has described. Besides, in the display device 100 according to an embodiment of the present invention, which is shown in FIG. 1, inputs the converted picture signal into the pattern generator 118 after the linear converter 116 converts a picture signal to have a linear characteristic, though, the pattern generator 118 and the linear converter 116 may switch with each other.

Next, changes in a characteristic of a signal flowing in the display device 100 according to an embodiment of the present invention will be described. FIG. 2A-FIG. 2F are illustrations that graphically illustrate changes in a characteristic of a signal flowing in the display device 100 according to an embodiment of the present invention. Each graph in FIG. 2A-FIG. 2F is shown with an abscissa representing input and an ordinate representing output.

Figure 2A:
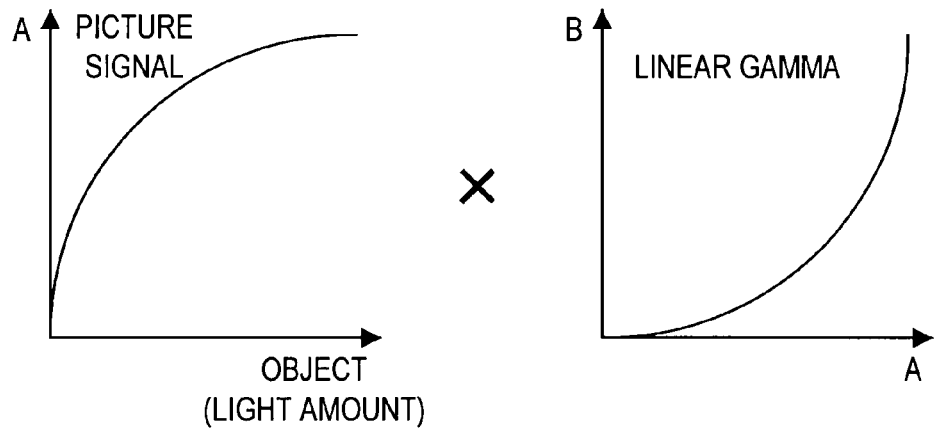
FIG. 2A is an illustration that graphically illustrates changes of the characteristic of a signal flowing to the display device 100 according to an embodiment of the present invention.

FIG. 2A shows that, when an object is input, the linear converter 116 multiplies a picture signal, which is to be output with a gamma characteristic as an output A for the light amount of the object, by an inverse gamma curve (linear gamma) so as to convert the picture signal to be output with a linear characteristic for the light amount of the object.

Figure 2B:
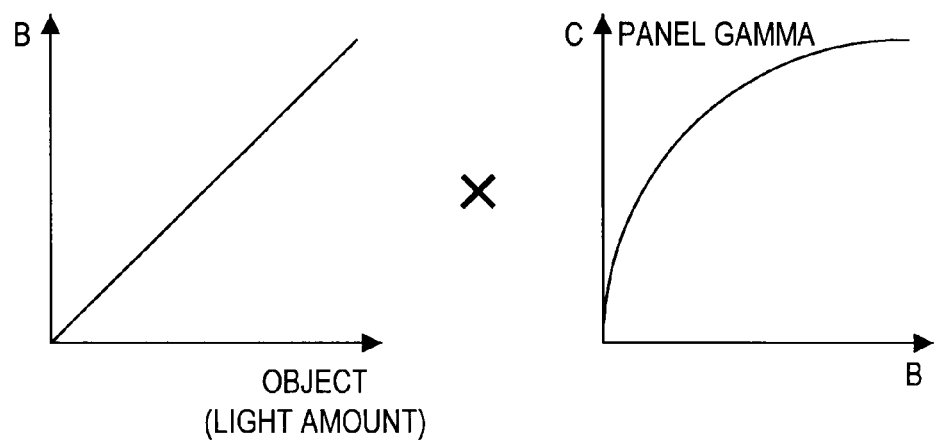
FIG. 2B is an illustration that graphically illustrates changes of the characteristic of a signal flowing to the display device 100 according to an embodiment of the present invention.

FIG. 2B shows that the gamma converter 132 multiplies the picture signal, which has been converted to be output with a linear characteristic as an output B for the input of the light amount of the object, by a gamma curve so as to convert the picture signal to be output with a gamma characteristic for an input of the light amount of the subject.

Figure 2C:
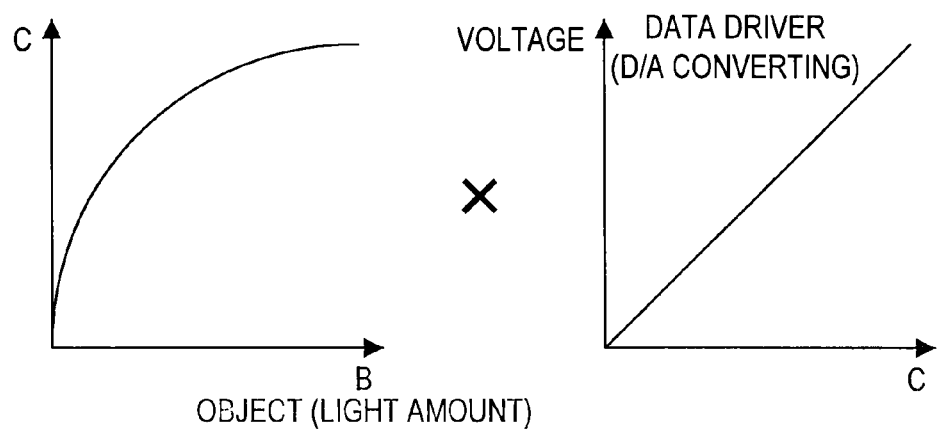
FIG. 2C is an illustration that graphically illustrates changes of the characteristic of a signal flowing to the display device 100 according to an embodiment of the present invention.

FIG. 2C shows that the data driver 152 perform D/A converting on the picture signal, which has been converted to be output with a gamma characteristic as an output C for an input of the light amount of the object. In the D/A conversion, a relation between an input and an output has a linear characteristic. Therefore, upon inputting a light amount of a subject, an output voltage has a gamma characteristic, by the data driver 152 performing D/A converting.

Figure 2D:
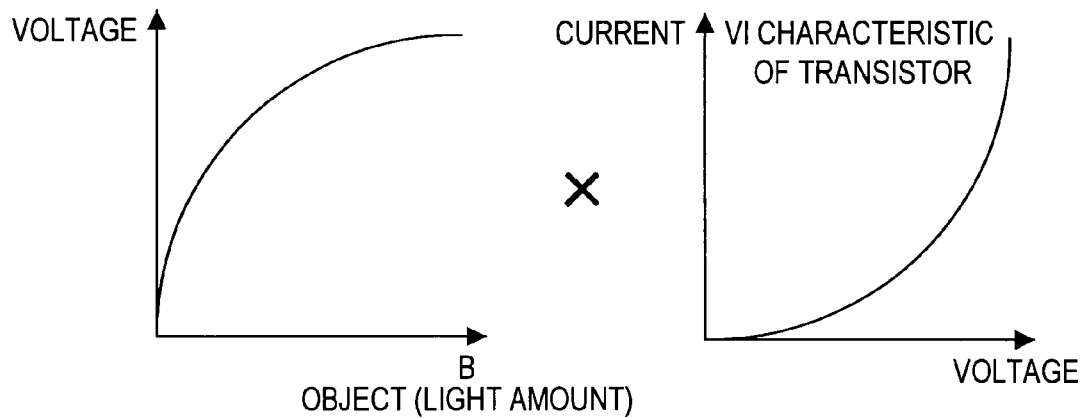
FIG. 2D is an illustration that graphically illustrates changes of the characteristic of a signal flowing to the display device 100 according to an embodiment of the present invention.

FIG. 2D shows that the picture signal after performed the D/A conversion is input into a transistor included in the panel 158 so that both gamma characteristics are cancelled. The VI characteristic of the transistor is the gamma characteristic which has a curve inverse to a gamma characteristic of the output voltage for the input of the light amount of the object. Therefore, upon inputting a light amount of an object, conversion can be again carried out, so that the output current has a linear characteristic.

Figure 2E:
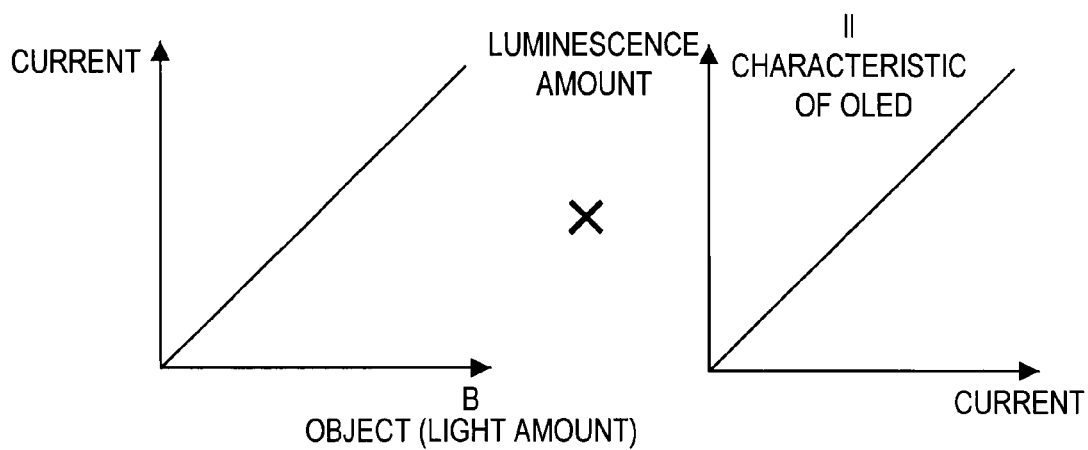
FIG. 2E is an illustration that graphically illustrates changes of the characteristic of a signal flowing to the display device 100 according to an embodiment of the present invention.

FIG. 2E shows that, when the signal whose output current has a linear characteristic is input into the panel 158 upon inputting the light characteristic of the object, the signal with the linear characteristic is multiplied by the IL characteristic of organic EL elements, which has a linear characteristic as described above.

Figure 2F:
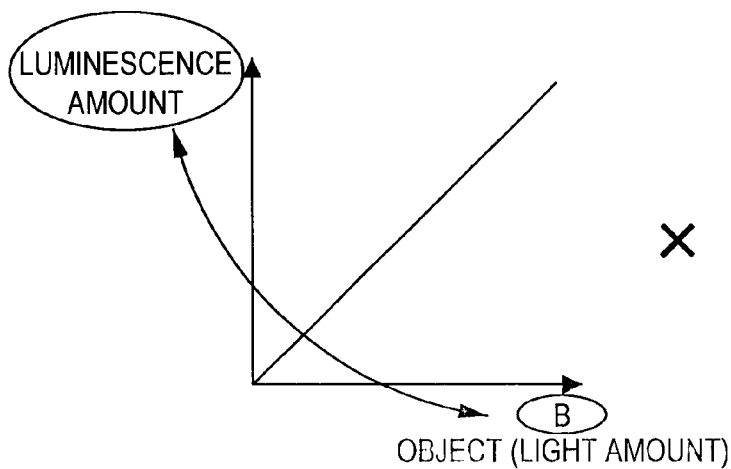
FIG. 2F is an illustration that graphically illustrates changes of the characteristic of a signal flowing to the display device 100 according to an embodiment of the present invention.

As a result, as shown in FIG. 2F, when the light quantity of the object is input, because the luminescence amount of the panel (OLED: Organic Light Emitting Diode) has the linear characteristic, the linear converter 116 multiplies the picture signal by an inverse gamma curve and converts the picture signal to have a linear characteristic, so that signal processes will be enable with the section between the linear converter 116 and the gamma converter 132 in the signal processing integrated circuit 110 shown in FIG. 1 assumed as a linear area.

In the above, the changes in signal characteristics of the signals flowing in the display device 100 according to an embodiment of the present invention have been described.

[Pixel Circuit Structure]

Next, an example of the structure of a pixel circuit provided for the panel 158 will be described.

Figure 3:
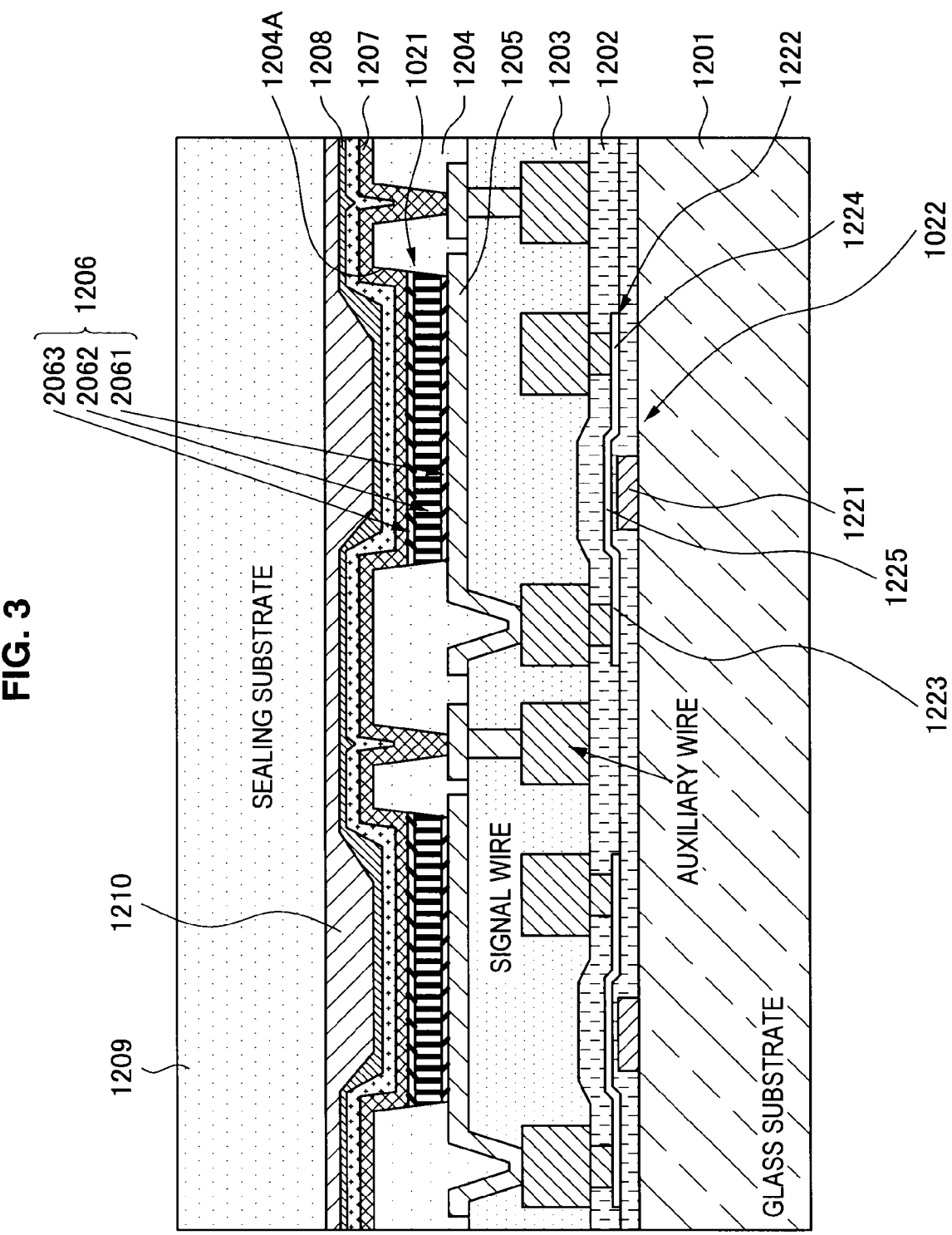
FIG. 3 is a cross-sectional diagram that shows an example of the cross-sectional structure of a pixel circuit provided for the panel 158.

FIG. 3 is a cross-sectional diagram that shows an example of the cross-sectional structure of a pixel circuit provided for the panel 158. As shown in FIG. 3, the pixel circuit provided for the panel 158 is configured to have a dielectric film 1202, a dielectric planarising film 1203, and a window dielectric film 1204 on a glass substrate 1201 where a driving transistor 1022 and the like are formed, each of which is formed in this order, and to have organic EL elements 1021 provided for recessed parts 1204A in this window dielectric film 1204. Here, only the driving transistor 1022 of each element of the driving circuit is depicted, and depictions for the other elements are omitted.

An organic EL element 1021 includes an anode electrode 1205 made of metals and the like formed at the bottom part of a recessed part 1204A in the above-mentioned window dielectric film 1204, and an organic layer (electron transport layer, luminescence layer, and hole transmit layer/hole inject layer) 1206 formed on this anode electrode 1205, a cathode electrode 1207 made of a transparent conductive film and the like formed on this organic layer commonly for all of the elements.

In such an organic EL element 1021, the organic layer is formed by sequentially depositing a hole transmit layer/hole inject layer 2061, and a luminescence layer 2062, an electrode transport layer 2063, and an electrode inject layer (not shown) on the anode electrode 1205. Then, upon current driving of the driving transistor 1022, a current flows from the driving transistor 1022 to the organic layer 1206 through the anode electrode 1205, so that light will be emitted when an electron and a hole recombine at the luminescence layer 2062 in this organic layer 1206.

The driving transistor 1022 includes a gate electrode 1221, a source/drain area 1223 provided on one side of a semiconductor layer 1222, a drain/source area 1224 provided on the other side of the semiconductor layer 1222, a channel forming area 1225 which is a part opposite to the gate electrode 1221 of the semiconductor layer 1222. The source/drain area 1223 is electrically connected to the anode electrode 1205 of the organic EL element 1021 via a contact hole.

Then, as shown in FIG. 3, after, on the glass substrate 1201 with the driving circuit formed including the driving transistor 1022, the organic EL element 1021 is formed via the dielectric film 1202, the dielectric planarising film 1203, and the window dielectric film 1204 on a pixel basis, a sealing substrate 1209 is bonded via a passivation film 1208 by adhesive 1210, and then the organic EL element 1021 is sealed by this sealing substrate 1209, thus the panel 158 is formed.

[Driving Circuit]

Next, an example of the configuration of a driving circuit provided for the panel 158 will be described.

Although there are various circuits as a driving circuit for driving a luminescence part ELP including an organic EL element, the common matters amongst a driving circuit essentially including 5 transistors/1 capacitor (which may be designated below as a 5 Tr/1 C driving circuit), a driving circuit essentially including 4 transistors/1 capacitor (which may be designated below as a 4 Tr/1 C driving circuit), a driving circuit essentially including 3 transistors/1 capacitor (which may be designated below as a 3 Tr/1 C driving circuit), and a driving circuit essentially including 2 transistors/1 capacitor (which may be designated below as a 2 Tr/1 C driving circuit) will be, first of all, described in the following.

For reasons of simplicity, each transistor included in a driving circuit will be described with the assumption that it includes an n-channel type thin film transistor (TFT). However, in some cases, some transistor can include p-channel type TFT. Besides, a transistor can be configured to form on a semiconductor substrate or the like. The structure of a transistor included in a driving circuit is not particularly limited. In the following explanation, a transistor included in a driving circuit will be described with the assumption that it is enhancement type, though it is not limited thereto. A depression type transistor may be used. And, a transistor included in a driving circuit may also be single gate type or dual gate type.

In the following explanation, it is assumed that a display device includes (N/3)×M pixels arranged in a 2-dimension matrix pattern, and that each pixel include three sub-pixels (a red luminescence sub-pixel that emits red light, a green luminescence sub-pixel that emits green light, and a blue luminescence sub-pixel that emits blue light). And, luminescence elements included in each pixel are assumed to be line sequentially driven, and the display frame rate is represented by FR (frames/sec.). Now, luminescence elements included in each of (N/3) pixels arranged in the m-th row (where m=1, 2, 3, . . . , M), or more specifically N sub-pixels, are driven simultaneously. In other words, the timing for emitting light or not of each luminescence element included in one row is controlled on the basis of the row to which they belong. Besides, the process for writing a picture signal onto each pixel included in one row may be a process of writing a picture signal simultaneously onto all of the pixels (which may be simply designated as the simultaneous writing process), or a process of writing a picture signal sequentially onto each pixel (which may be simply designated as the sequential writing process). Either of the writing processes is optionally chosen depending on the configuration of a driving circuit.

Here, as a matter of principle, driving and operation related to a luminescence element located on the m-th row and the n-th column (where n=1, 2, 3, . . . , N) will be described, where such a luminescence element is designated as the (n, m) luminescence element or the (n, m) sub-pixel. Then, until a horizontal scanning period (m-th horizontal scanning period) for each luminescence element arranged in m-th row expires, various processes (the threshold voltage cancelling process, the writing process, and the mobility adjusting process, which are described below) are performed. Besides, the writing process and the mobility adjusting process are necessarily performed during the m-th horizontal scanning period. On the other hand, some types of driving circuit can perform the threshold voltage cancelling process and the corresponding pre-process prior to the m-th horizontal scanning period.

Then, after all of the above-mentioned various processes are done, a luminescence part included in each luminescence element arranged in the m-th row is made luminous. Besides, luminescence parts may be made luminous immediately when all of the above-mentioned various processes are done, or may be made luminous after a predetermined period (e.g., a horizontal scanning period for the predetermined number of rows) expires. Such periods can be optionally set, depending on the specification of a display device and the configuration of a driving circuit and the like. Besides, in the following explanation, for reasons of simplicity, luminescence parts are assumed to be made luminous immediately when various processes are done. Then, the luminosity of a luminescence part included in each luminescence element arranged in the m-th row is maintained until just before beginning of the horizontal scanning period of each luminescence element arranged in (m+m')-th row, where " m'" is determined according to the design specification of a display device. In other words, the luminosity of a luminescence part included in each luminescence element arranged in the m-th row in a given display frame is maintained until the (m+m'1)-th horizontal scanning period. On the other hand, from the beginning of the (m+m')-th horizontal scanning period until the writing process or the mobility adjusting process are done within the m-th horizontal scanning period in the next display frame, a luminescence part included in each luminescence element arranged in the m-th row maintains non luminous state in principle. By provide the above-mentioned period of non luminous state (which may be simply designated as non luminous period in the following), afterimage blur involved in active matrix driving is reduced, and quality of moving image can be more excellent. However, the luminous state/non luminous state of each sub-pixel (luminescence element) is not limited to the above-mentioned state. And, the time length of a horizontal scanning period is a time length shorter than (1/FR)×(1/M) seconds. If the value of (m+m') is above M, the horizontal scanning period for the extra is managed in the next display frame.

For two source/drain areas of one transistor, the term "one source/drain area" may be used in the meaning of the source/drain area on the side connected to a power source. And, the case where a transistor is in ON state means a situation that a channel is formed between source/drain areas. It does not matter whether a current flows from one source/drain area of this transistor to another. On the other hand, the case where a transistor is in OFF state means a situation that no channel is formed between source/drain areas. And, the case where a source/drain area of a given transistor is connected to source/drain area of another transistor embraces a mode where the source/drain area of the given transistor and the source/drain area of the other transistor possess the same area. Furthermore, a source/drain area can be formed not only from conductive materials, such as polysilicon, amorphous silicon and the like, but also from metals, alloys, conductive particles, layered structure thereof, and a layer made of organic materials (conductive polymers). And, in the timing chart to be used in the following explanation, lengths (time lengths) along the transverse axis indicating respective periods are typical, and they does not indicate rate of time lengths of respective periods.

Figure 4:
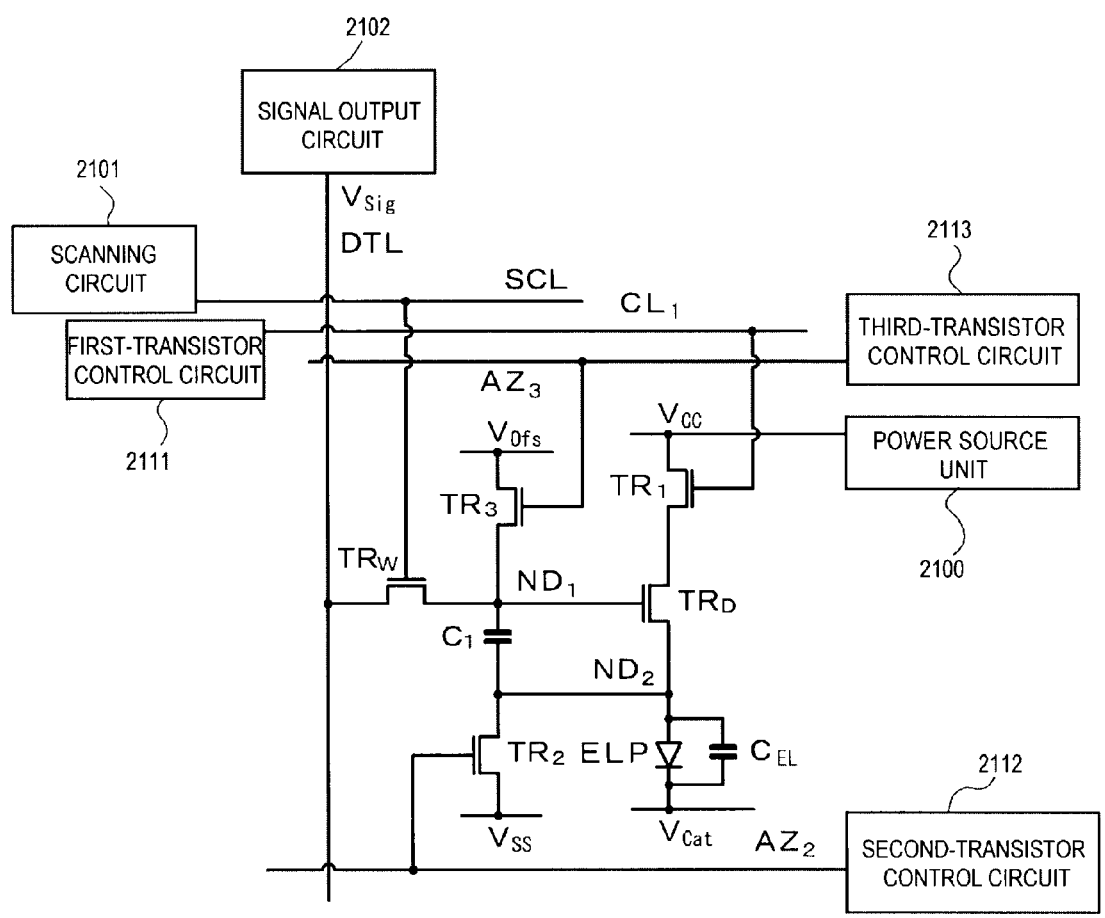
FIG. 4 is an equivalent circuit diagram for a 5 Tr/1 C driving circuit.

A method of driving a luminescence part ELP using the driving circuit shown in FIG. 4, etc. includes, for example, the steps of (a) performing a pre-process of applying a first-node initialising voltage to the first node $ND_1$ and a second-node initialising voltage to the second node $ND_2$, so that the potential difference between the first node $ND_1$ and the second node $ND_2$ is above the threshold voltage of the driving transistor $TR_D$ and the potential difference between the second node ND2 and the cathode electrode included in the luminescence part ELP is not above the threshold voltage of the luminescence part ELP, and (b) performing a threshold voltage cancelling process of changing the voltage of the second node $ND_2$ towards a voltage obtained by subtracting the threshold voltage of the driving transistor $TR_D$ from the voltage of the first node $ND_1$, with the voltage of the first node $ND_1$ maintained, then (c) performing a writing process of applying a picture signal to the first node $ND_1$ from the data line DTL via the writing transistor $TR_W$ that is made to be in ON state by a signal from the scan line SCL, and (d) driving the luminescence part ELP, by making the writing transistor $TR_W$ to be in OFF state by a signal from the scan line SCL to make the first node $ND_1$ to be in floating state and running a current depending on the value of the potential difference between the first node $ND_1$ and the second node $ND_2$ from the power source unit 2100 to the luminescence part ELP via the driving transistor $TR_D$.

As described above, in the above-mentioned step (b), the threshold voltage cancelling process of changing the voltage of the second node $ND_2$ towards a voltage obtained by subtracting the threshold voltage of the driving transistor $TR_D$ from the voltage of the first node $ND_1$ is performed. More specifically, in order to change the voltage of the first node $ND_1$ towards the voltage obtained by subtracting the threshold voltage of the driving transistor $TR_D$ from the voltage of the first node $ND_1$, a voltage which is above a voltage obtained by adding the threshold voltage of the driving transistor $TR_D$ to the voltage of the second node $ND_2$ in the above-mentioned step (a) is applied to one source/drain area of the driving transistor $TR_D$. Qualitatively, in the threshold voltage cancelling process, how close the potential difference between the first node $ND_1$ and the second node $ND_2$ (i.e., the potential difference the gate electrode and the source area of the driving transistor $TR_D$) approaches to the threshold voltage of the driving transistor $TR_D$ depends on time for the threshold voltage cancelling process. Therefore, as in a mode where enough long time is secured for the threshold voltage cancelling process, the voltage of the second node $ND_2$ reaches at the voltage obtained by subtracting the threshold voltage of the driving transistor $TR_D$ from the voltage of the first node $ND_1$, and the driving transistor $TR_D$ gets in OFF state. On the other hand, as in a mode where there is no choice but to set the time for the threshold voltage cancelling process short, the potential difference between the first node ND1 and the second node ND2 may be larger than the threshold voltage of the driving transistor TRD, and the driving transistor TRD may be not get in OFF state. As a result of the threshold voltage cancelling process, the driving transistor TRD does not necessarily get in OFF state.

Next, for each driving circuit, the configuration of the driving circuits, and a method of driving a luminescence part ELP using such driving circuits are described below in detail.

[5 Tr/1 C Driving Circuit]

Figure 5:
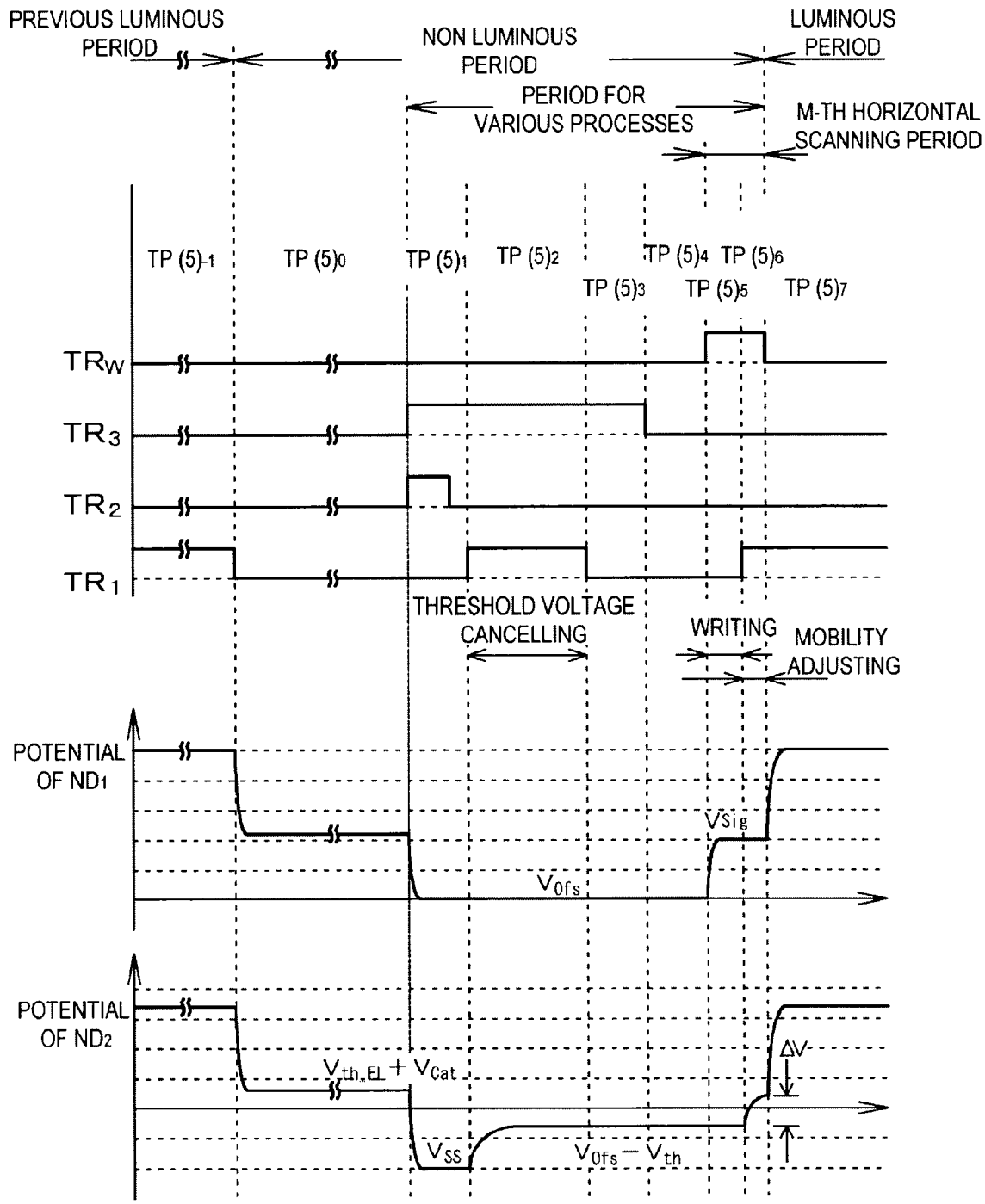
FIG. 5 is a timing chart for driving of the 5 Tr/1 C driving circuit.

An equivalent circuit diagram for a 5 Tr/1 C driving circuit is shown in FIG. 4, a timing chart for driving of the 5 Tr/1 C driving circuit shown in FIG. 4 is typically shown in FIG. 5, and the on/off state of each of the transistors in the 5 Tr/1 C driving circuit shown in FIG. 4, etc. are typically shown in FIG. 6A-6I.

Such a 5 Tr/1 C driving circuit includes five transistors: a writing transistor $TR_W$; a driving transistor $TR_D$; a first transistor $TR_1$; a second transistor $TR_2$; and a third transistor $TR_3$, and further includes one capacitor $C_1$. Besides, the writing transistor $TR_W$, the first transistor $TR_1$, the second transistor $TR_2$, and the third transistor $TR_3$ may be formed out of p-channel type TFT.

[First Transistor $TR_1$]

One source/drain area of the first transistor $TR_1$ is connected to a power source unit 2100 (voltage $V_{cc}$), and the other source/drain area of the first transistor $TR_1$ is connected to one source/drain area of the driving transistor $TR_D$. And, the ON/OFF operation of the first transistor $TR_1$ is controlled by a first-transistor control line $CL_1$, which is extended from a first-transistor control circuit 2111 to connect to the gate electrode of the first transistor $TR_1$. The power source unit 2100 is provided for supply a current to a luminescence part ELP to make the luminescence part ELP luminous.

[Driving Transistor $TR_D$]

As described above, one source/drain area of the driving transistor $TR_D$ is connected to the other source/drain area of the first transistor $TR_1$. On the other hand, the other source/drain area of the driving transistor $TR_D$ is connected to
(1) the anode electrode of the luminescence part ELP,
(2) the other source/drain area of the second transistor $TR_2$, and
(3) one source/drain area of the capacitor $C_1$, and forms a second node $ND_2$. And, the gate electrode of the driving transistor $TR_D$ is connected to
(1) the other source/drain area of the writing transistor $TR_W$,
(2) the other source/drain area of the third transistor $TR_3$, and
(3) the other electrode of the capacitor $C_1$,
and forms a first node $ND_1$.

Here, the driving transistor $TR_D$ is driven to flow a drain current $I_{ds}$ according to the following equation (1) in the case of the luminous state of a luminescence element. In the case of the luminous state of a luminescence element, one source/drain area of the driving transistor $TR_D$ works as a drain area, and the other source/drain area works as a source area. For the reason of simplicity of explanation, in the following explanation, one source/drain area of the driving transistor $TR_D$ may be simply designated as the drain area, and the other source/drain area may be simply designated as the source area. Besides, L: Channel Length;
W: Channel Width;
$V_{gs}$: Potential Difference between Gate Electrode and Source Area;
$V_{th}$: Threshold Voltage;
$C_{ox}$: (Relative Permittivity of Gate Dielectric Layer)×(Permittivity of Vacuum)/(Thickness of Gate Dielectric Layer); and $$k \equiv (1/2) \cdot (W/L) \cdot C_{ox}.$$

$$I_{ds} = k \cdot \mu \cdot (V_{gs} - V_{th})^2 \quad (1)$$

This drain current $I_{ds}$ flows into the luminescence part ELP so that the luminescence part ELP emits light. Moreover, the luminescence state (luminance) of the luminescence part ELP is controlled depending on the magnitude of the value of this drain current $I_{ds}$.

[Writing Transistor $TR_W$]

As described above, the other source/drain area of the writing transistor $TR_W$ is connected to the gate electrode of the driving transistor $TR_D$. On the other hand, one source/drain area of the writing transistor $TR_D$ is connected a data line DTL, which is extended from a signal output circuit 2102. Then, a picture signal $V_{Sig}$ for controlling the luminance of the luminescence part ELP is supplied to the one source/drain area via the data line DTL. Besides, various signals and voltages (signals for pre-charge driving, various reference voltages, etc.) except for the $V_{Sig}$ may be supplied to the one source/drain area via the data line DTL. And, the ON/OFF operation of the writing transistor $TR_W$ is controlled by a scan line SCL, which is extended from a scanning circuit 2101 to connect to the gate electrode of the writing transistor $TR_W$.

[Second Transistor $TR_2$]

As described above, the other source/drain area of the second transistor $TR_2$ is connected to the source area of the driving transistor $TR_D$. On the other hand, a voltage $V_{SS}$ for initialising the potential of the second node $ND_2$ (i.e., the potential of the source area of the driving transistor $TR_D$) is supplied to one source/drain area of the second transistor $TR_2$. And, the ON/OFF operation of the second transistor $TR_2$ is controlled by a second-transistor control line $AZ_2$, which is extended from a second-transistor control circuit 2112 to connect to the gate electrode of the second transistor $TR_2$.

[Third Transistor $TR_3$]

As described above, the other source/drain area of the third transistor $TR_3$ is connected to the gate electrode of the driving transistor $TR_D$. On the other hand, a voltage $V_{Ofs}$ for initialising the potential of the first node $ND_1$ (i.e., the potential of the gate electrode of the driving transistor $TR_D$) is supplied to one source/drain area of the third transistor $TR_3$. And, the ON/OFF operation of the third transistor $TR_3$ is controlled by a third-transistor control line $AZ_3$, which is extended from a third-transistor control circuit 2113 to connect to the gate electrode of the third transistor $TR_3$.

[Luminescence Part ELP]

As described above, the anode electrode of the luminescence part ELP is connected to the source area of the driving transistor $TR_D$. On the other hand, a voltage $V_{Cat}$ is applied to the cathode electrode of the luminescence part ELP. The capacitance of the luminescence part ELP is represented by a symbol: $C_{EL}$. And, a threshold voltage which is necessary for the luminescence part ELP to be luminous is represented by $V_{th-EL}$. Thus, when voltage equal to or more than $V_{th-EL}$ is applied between the anode and cathode electrodes of the luminescence part ELP, the luminescence part ELP is made luminous.

In the following explanation, the values of voltages or potentials are given as follows, though the followings are exemplary values at all and they are not limited to these values.

$V_{Sig}$: Picture Signal for Controlling Luminance of Luminescence Part ELP
  ... 0 Volts-10 Volts $V_{CC}$: Voltage of Power Source Unit 2100
  ... 20 Volts $V_{Ofs}$: Voltage for initialising Potential of Gate Electrode of Driving Transistor $TR_D$ (Potential of First Node $ND_1$)
  ... 0 Volts $V_{SS}$: Voltage for initialising Potential of Source Area of Driving Transistor $TR_D$ (Potential of Second Node $ND_2$)
  ... -10 Volts $V_{th}$: Threshold Voltage of Driving Transistor $TR_D$
  ... 3 Volts $V_{Cat}$: Voltage applied to Cathode Electrode of Luminescence Part ELP
  ... 0 Volts $V_{th-EL}$: Threshold Voltage of Luminescence Part ELP
  ... 3 Volts In the following, the operation of a 5 Tr/1 C driving transistor will be described. Besides, as described above, the explanation will be provided with the assumption that luminous state starts immediately after all of the various processes (the threshold voltage cancelling process, the writing process, the mobility adjusting process) are done, it is not limited to this. The explanations of 4 Tr/1 C driving circuit, 3 Tr/1 C driving circuit, and 2 Tr/1 C driving circuit are similarly provided below.

Figure 6A:
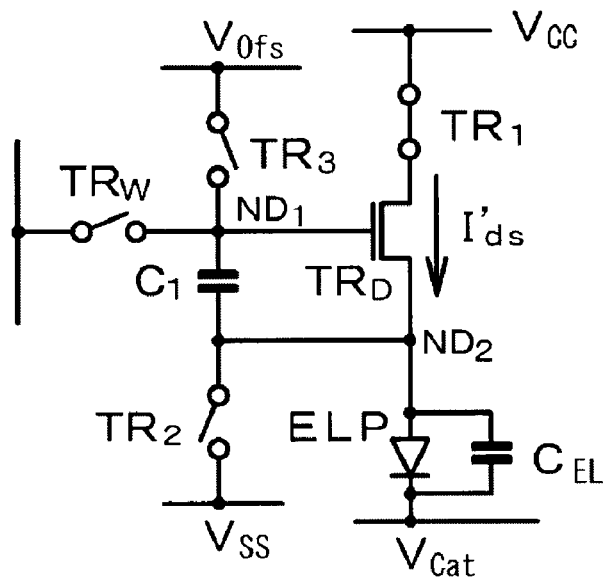
FIG. 6A is an illustration that shows ON/OFF state of each of the transistors in the 5 Tr/1 C driving circuit, etc.

[Period—TP(5)$_{-1}$] (see FIG. 5 and FIG. 6A)

This [Period—TP(5)$_{-1}$] is, for example, an operation in the previous display frame, and a period for which the (n, m) luminescence element is in luminous state after the last various processes are done. Thus, a drain current I' based on the equation (5) below flows into a luminescence part ELP of a luminescence element included in the (n, m) sub-pixel, and the luminance of the luminescence element included in the (n, m) sub-pixel is a value depending on this drain current I'. Here, the writing transistor $TR_W$, the second transistor $TR_2$, and the third transistor $TR_3$ are in OFF state, and the first transistor $TR_1$ and the driving transistor $TR_D$ are in ON state. The luminous state of the (m, n) luminescence element is maintained until just before the beginning of the horizontal scanning period for a luminescence element arranged in the (m+m')-th row.

[Period—TP(5)$_0$]-[Period—TP(5)$_4$] are operation periods laid after the luminous state after completion of the last various processes ends, and just before the next writing process is executed. In other words, these [Period—TP(5)$_0$]-[Period—TP(5)$_4$] are periods of a particular time length from the beginning of the (m+m')-th horizontal scanning period in the previous display frame to the end of the (m−1)-th horizontal scanning period in the current display frame. Besides, [Period—TP(5)$_0$]-[Period—TP(5)$_4$] may be configured to be included within the m-th horizontal scanning period in the current display frame.

Then, for these [Period—TP(5)$_0$]-[Period—TP(5)$_4$], the (n, m) luminescence element is in non luminous state in principle. In other words, for [Period—TP(5)$_0$]-[Period—TP(5)$_1$] and [Period—TP(5)$_3$]-[Period—TP(5)$_4$], the luminescence element does not emit light since the first transistor $TR_1$ is in OFF state. Besides, for [Period—TP(5)$_2$], the first transistor $TR_1$ is in ON state. However, the threshold voltage cancelling process to be described below is executed for this period. Given that the equation (2) below is satisfied, the luminescence element will not be luminous, which is described in detail in the explanation of the threshold voltage cancelling process.

In the following, each period of [Period—TP(5)$_0$]-[Period—TP(5)$_4$] will be first described. Besides, the beginning of [Period—TP(5)$_1$], and the length of each period of [Period—TP(5)$_0$]-[Period—TP(5)$_4$] are optionally set according the settings of a display device.

[Period—TP(5)$_0$]

As described above, for this [Period—TP(5)$_0$], the (n, m) luminescence element is in non luminous state. The writing transistor $TR_W$, the second transistor $TR_2$, and the third transistor $TR_3$ are in OFF state. And, because the first transistor $TR_1$ gets into OFF state at the time point for transition from [Period—TP(5)$_{-1}$] to [Period—TP(5)$_0$], the potential of the second node $ND_2$ (the source area of the driving transistor $TR_D$ or the anode electrode of the luminescence part ELP) is lowered to ($V_{th-EL}+V_{Cat}$), and the luminescence part ELP gets into non luminous state. And, as the potential of the second node $ND_2$ gets lower, the potential of the first node $ND_1$ in floating state (the gate electrode of the driving transistor $TR_D$) is also lowered.

Figure 6B:
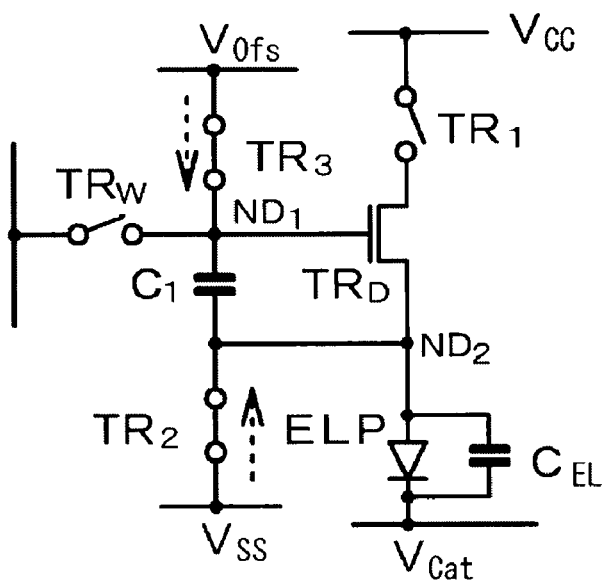
FIG. 6B is an illustration that shows ON/OFF state of each of the transistors in the 5 Tr/1 C driving circuit, etc.
Figure 6C:
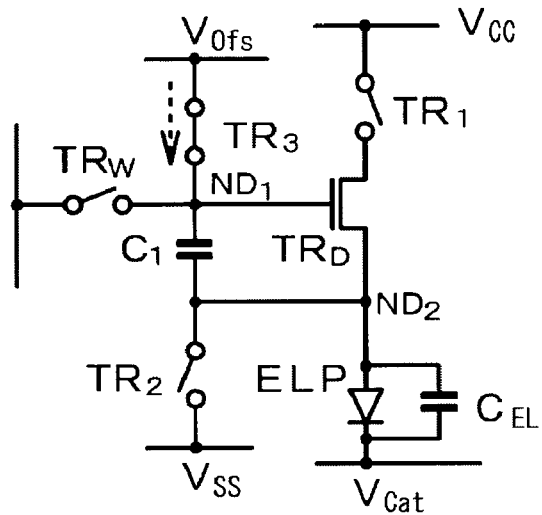
FIG. 6C is an illustration that shows ON/OFF state of each of the transistors in the 5 Tr/1 C driving circuit, etc.

[Period—TP(5)$_1$] (see FIG. 6B and FIG. 6C)

For this [Period—TP(5)$_1$], a pre-process for execute the threshold voltage cancelling process to be described below. Now, at the beginning of [Period—TP(5)$_1$], the second transistor $TR_2$ and the third transistor $TR_3$ are got into ON state by getting the second-transistor control line $AZ_2$ and the third-transistor control line $AZ_3$ to be at high level. As a result, the potential of the first node $ND_1$ becomes $V_{Ofs}$ (e.g., 0 volts). On the other hand, the potential of the second node $ND_2$ becomes $V_{SS}$ (e.g., −10 volts). Then, before the expiration of [Period—TP(5)$_1$], the second transistor $TR_2$ is got into OFF state by getting the second-transistor control line $AZ_2$ to be at low level. Besides, the second transistor $TR_2$ and the third transistor $TR_3$ may be simultaneously got into ON state, or the second transistor $TR_2$ may be first got into ON state, or the third transistor $TR_3$ may be first got into ON state.

By the process above, the potential between the gate electrode and source area of the driving transistor $TR_D$ becomes above $V_{th}$. The driving transistor $TR_D$ is in ON state.

Figure 6D:
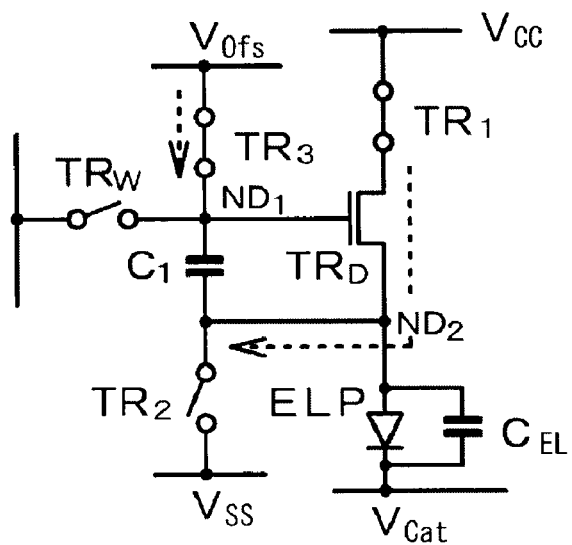
FIG. 6D is an illustration that shows ON/OFF state of each of the transistors in the 5 Tr/1 C driving circuit, etc.

[Period—TP(5)$_2$] (see FIG. 6D)

Next, the threshold voltage cancelling process is executed. Now, the first transistor $TR_1$ is got into ON state by getting the first-transistor control line $CL_1$ to be at high level with the third transistor $TR_3$ maintained in ON state. As a result, the potential of the first node ND, does not change ($V_{Ofs}$=0 volt maintained), whilst the potential of the second node $ND_2$ changes towards the potential obtained by subtracting the threshold voltage $V_{th}$ of the driving transistor $TR_D$ from the potential of the first node $ND_1$. In other words, the potential of the second node $ND_2$ in floating state increases. Then, when the potential difference between the gate electrode and source area of the driving transistor $TR_D$ reaches to $V_{th}$, the driving transistor $TR_D$ gets into OFF state. Specifically, the potential of the second node $ND_2$ in floating state approaches to ($V_{Ofs}-V_{th}$=−3 volts>$V_{SS}$) to be ($V_{Ofs}-V_{th}$) in the end. Here, if the following equation (2) is assured, in other words, if the potentials are selected and determined to satisfy equation (2), the luminescence part ELP will not be luminous.

$$(V_{Ofs}-V_{th})<(V_{th-EL}+V_{Cat}) \qquad (2)$$

For [Period—TP(5)$_5$], the potential of the second node ND$_2$ will be (V$_{Ofs}$−V$_{th}$) eventually. In other words, the potential of the second node ND$_2$ is determined, depending only on the threshold voltage Vth of the driving transistor TR$_D$, and on the potential V$_{Ofs}$ for initialising the gate electrode of the driving transistor TR$_D$; namely not on the threshold voltage V$_{th\text{-}EL}$ of the luminescence part ELP.

Figure 6E:
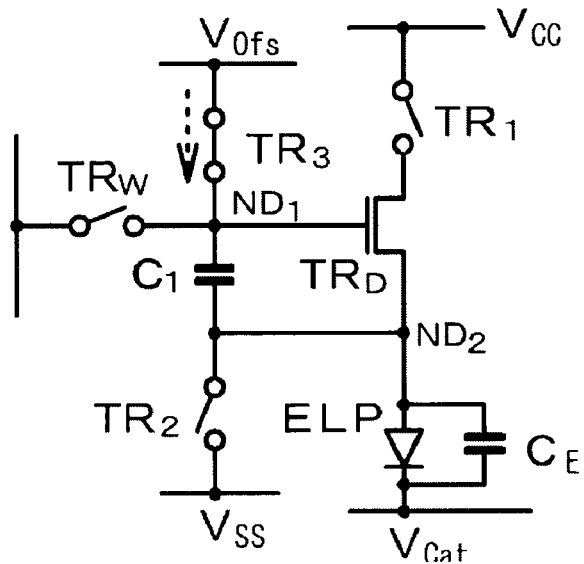
FIG. 6E is an illustration that shows ON/OFF state of each of the transistors in the 5 Tr/1 C driving circuit, etc.

[Period—TP(5)$_3$] (see FIG. 6E)

Then, the first transistor TR$_1$ is got into OFF state by getting the first-transistor control line CL$_1$ to be at low level with the third transistor TR$_3$ maintained in ON state. As a result, the potential of the first node ND$_1$ does not change (V$_{Ofs}$=0 volt maintained), nor the potential of the second node ND$_2$ does not change to maintain (V$_{Ofs}$−V$_{th}$=−3 volts).

Figure 6F:
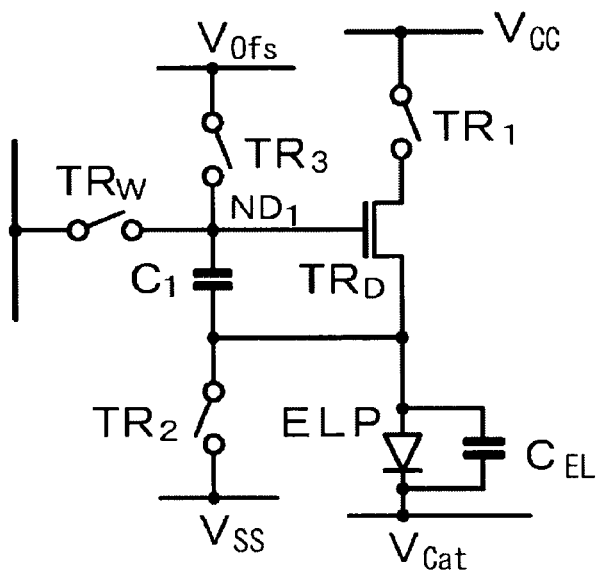
FIG. 6F is an illustration that shows ON/OFF state of each of the transistors in the 5 Tr/1 C driving circuit, etc.

[Period—TP(5)$_4$] (see FIG. 6F)

Next, the third transistor TR$_3$ is got into OFF state by getting the third-transistor control line AZ$_3$ to be at low level. The potentials of the first node ND$_1$ and the second node ND$_2$ do not change substantially. In practice, potential changes might occur by electrostatic bonding of parasitic capacitances or the like, however, these can be normally neglected.

Next, each period of [Period—TP(5)$_5$]-[Period—TP(5)$_7$] will be described. Besides, as described later, the writing process is executed for [Period—TP(5)$_5$], and the mobility adjusting process is executed for [Period—TP(5)$_6$]. As described above, these processes are necessarily executed within the m-th horizontal scanning period. For the reason of simplicity of the explanation, the explanation will be provided with the assumption that the beginning of [Period—TP(5)$_5$] and the end of [Period—TP(5)$_6$] match the beginning and end of the m-th horizontal scanning period, respectively.

Figure 6G:
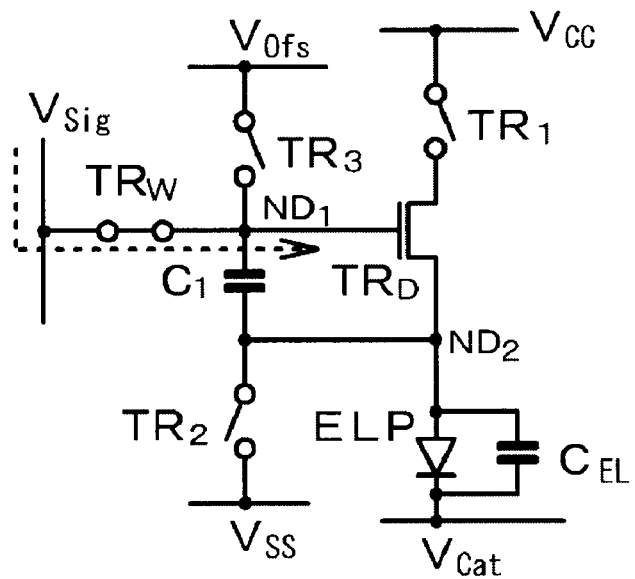
FIG. 6G is an illustration that shows ON/OFF state of each of the transistors in the 5 Tr/1 C driving circuit, etc.

[Period—TP(5)$_5$] (see FIG. 6G)

Then, the writing process for the driving transistor TR$_D$ is executed. Specifically, the data line DTL is made to be V$_{Sig}$ for controlling the luminance of the luminescence part ELP with the first transistor TR$_1$, the second transistor TR$_2$, and the third transistor TR$_3$ maintained in OFF state; next, the writing transistor TR$_W$ is got into ON state by getting the scan line SCL to be at high level. As a result, the potential of the first node ND$_1$ increases to V$_{Sig}$.

Here, the value of the capacitance of the capacitor C$_1$ is represented by c$_1$, and the value of the capacitance of the capacitance C$_{EL}$ of the luminescence part ELP is represented by c$_{EL}$. Then, the value of the parasitic capacitance between the gate electrode and source area of the driving transistor TR$_D$ is represented by c$_{gs}$. When the potential of the gate electrode of the driving transistor TR$_D$ changes from V$_{Ofs}$ to V$_{Sig}$ (>V$_{Ofs}$), the potentials of both sides of the capacitor C$_1$ (the potentials of the first node ND$_1$ and the second node ND$_2$) change, in principle. In other words, potentials based on the change (V$_{Sig}$−V$_{Ofs}$) of the potential of the gate electrode of the driving transistor TR$_D$ (=the potential of the first node ND$_1$) are allotted to the capacitor C$_1$, the capacitance C$_{EL}$ of the luminescence part ELP, and the parasitic capacitance between the gate electrode and source area of the driving transistor TR$_D$. Thus, if the value c$_{EL}$ is enough larger than the value c$_1$ and the value c$_{gs}$, the change of the potential of the source area of the driving transistor TR$_D$ (the second node ND$_2$) based on the change (V$_{Sig}$−V$_{Ofs}$) of the potential of the driving transistor TR$_D$ is small. Then, in general, the capacitance value c$_{EL}$ of the capacitance C$_{EL}$ of the luminescence part ELP is larger than the capacitance value c$_1$ of the capacitor C$_1$ and the value c$_{gs}$ of the parasitic capacitance of the driving transistor TR$_D$. Thus, for the reason of simplicity of the explanation, the explanation will be provided, except for the cases in particular necessities, without any regard to potential changes of the second node ND$_2$ which occur by potential changes of the first node ND$_1$. It is similar for the other driving circuits. Besides, the timing chart for driving shown in FIG. 5 is also shown without any regard to potential changes of the second node ND$_2$ which occur by potential changes of the first node ND$_1$. The value of V$_g$ and the value of V$_s$ is as follows, where V$_g$ is the potential of the gate electrode of the driving transistor TR$_D$ (the first node ND$_1$) and V$_s$ is the potential of the source area of the driving transistor TR$_D$ (the second node ND$_2$). Therefore, the potential difference between the first node ND$_1$ and the second node ND$_2$, namely the potential difference V$_{gs}$ between the gate electrode and source area of the driving transistor TR$_D$ can be expressed by equation (3) below.

$$V_g = V_{Sig}$$

$$V_s \approx V_{Ofs} - V_{th}$$

$$V_{gs} \approx V_{Sig} - (V_{Ofs} - V_{th}) \tag{3}$$

Thus, V$_{gs}$ obtained in the writing process for the driving transistor TR$_D$ depends on only the picture signal V$_{Sig}$ for controlling the luminance of the luminescence part ELP, the threshold voltage V$_{th}$ of the driving transistor TR$_D$, and the voltage V$_{Ofs}$ for initialising the gate electrode of the driving transistor TR$_D$, and has no relationship with the threshold voltage V$_{th\text{-}EL}$ of the luminescence part ELP.

Figure 6H:
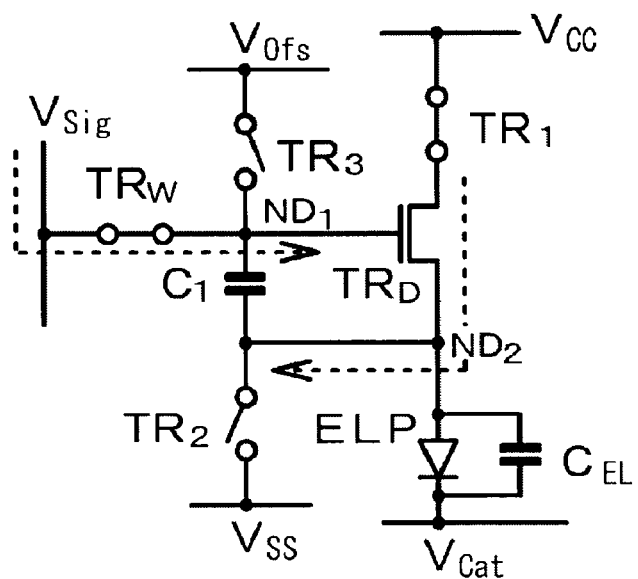
FIG. 6H is an illustration that shows ON/OFF state of each of the transistors in the 5 Tr/1 C driving circuit, etc.

[Period—TP(5)$_6$] (see FIG. 6H)

Then, an adjustment (mobility adjustment process) on the potential of the source area of the driving transistor TR$_D$ (the second node ND$_2$) based on the magnitude of the mobility μ of the driving transistor TR$_D$ is executed.

In general, if the driving transistor TR$_D$ is made of polysilicon film transistor or the like, it is hard to avoid that the mobility μ varies amongst transistors. Therefore, even if picture signals V$_{Sig}$s of the same value are applied to gate electrodes of a plurality of driving transistors TR$_D$s with different mobility μ, there will occur a difference between a drain current I$_{ds}$ flowing a driving transistor TR$_D$ with large mobility μ and a drain I$_{ds}$ flowing a driving transistor TR$_D$ with small mobility μ. Then, if such a difference occurs, the uniformity of the screen of a display device will be lost.

Therefore, specifically, the first transistor TR$_1$ is got into ON state by getting the first transistor control line CL$_1$ to be at high level with the writing transistor TR$_W$ maintained in ON state; next, by getting the first transistor control line CL$_1$ to be at high level after a predetermined time (t$_0$) has passed, the first transistor TR$_1$ is got into ON state, and next, by getting the scan line SCL to be at low level after a predetermined time (t$_0$) has passed, the writing transistor TR$_W$ is got into OFF state, and the first node ND$_1$ (the gate electrode of the driving transistor TR$_D$) is got into floating state. Then, as a result of the above, if the value of the mobility μ of the driving transistor TR$_D$ is large, the increased amount ΔV (potential adjustment value) of the potential of the source area of the driving transistor TR$_D$ is large, and if the value of the mobility μ of the driving transistor TR$_D$ is small, the increased amount ΔV (potential adjustment value) of the potential of the source area of the driving transistor TR$_D$ is small. Now, the potential difference V$_{gs}$ between the gate electrode and source area of the driving transistor TR$_D$ is transformed from equation (3) into equation (4) below.

$$V_{gs} \approx V_{Sig} - (V_{Ofs} - V_{th}) - \Delta V \tag{4}$$

Besides, the predetermined time for executing the mobility adjusting process (the total time t$_0$ of [Period—TP(5)$_6$]) can be determined in advance as a configuration value during the configuration of a display device. And, the total time t$_0$ of

[Period—TP(5)$_6$] is determined so that the potential of the source area of the driving transistor TR$_D$ in this case (V$_{Ofs}$−V$_{th}$+ΔV) satisfy equation (2') below. Then, this does not allow the luminescence part ELP to be luminous for [Period—TP(5)$_6$]. Moreover, an adjustment on the variation of the coefficient k (≡(1/2)·(W/L)·C$_{ox}$) is also executed simultaneously by this mobility adjusting process.

$$V_{Ofs} - V_{th} + \Delta V < (V_{th-EL} + V_{Cat}) \quad (2')$$

Figure 6I:
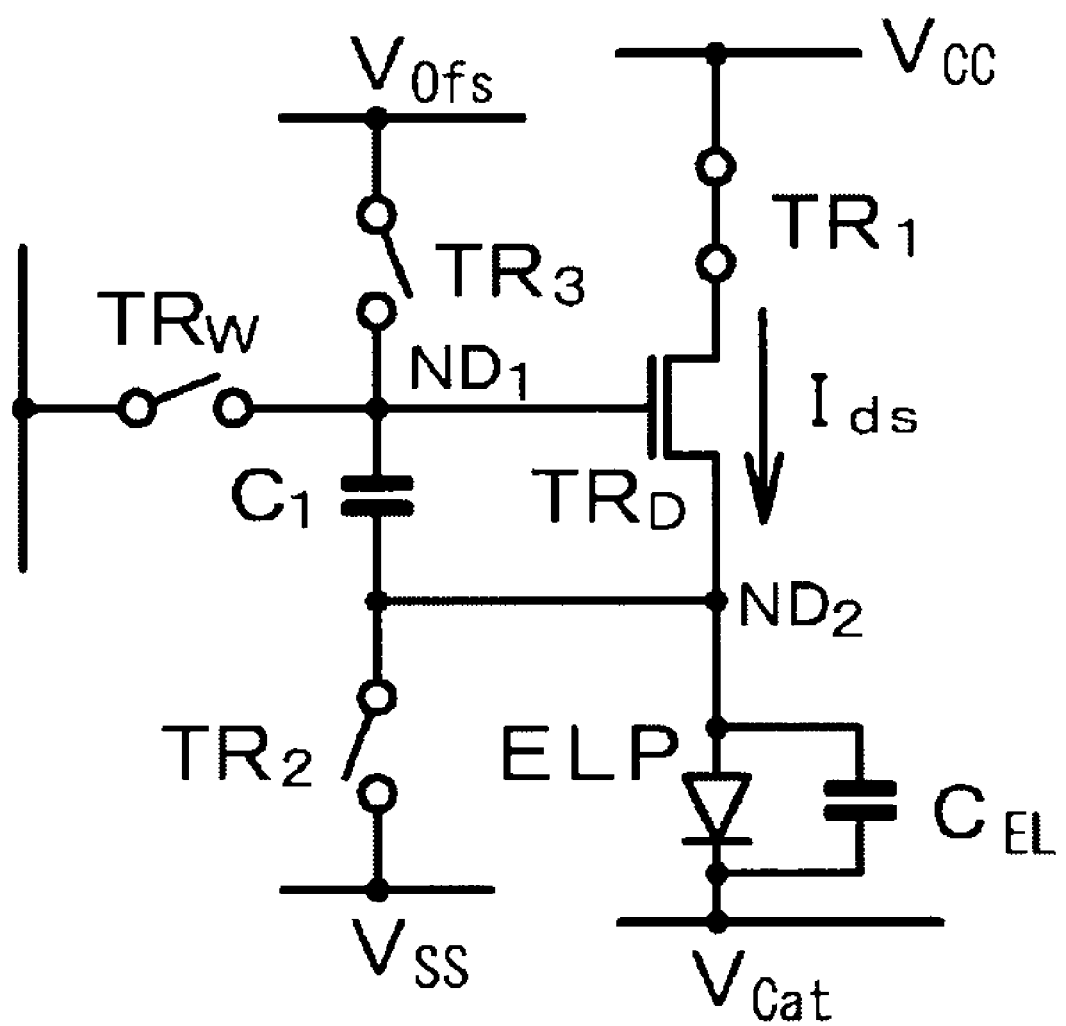
FIG. 6I is an illustration that shows ON/OFF state of each of the transistors in the 5 Tr/1 C driving circuit, etc.

[Period—TP(5)$_7$] (see FIG. 6I)

By the above operations, the threshold voltage cancelling process, the writing process, and the mobility adjusting process are done. Now, low level of the scan line SCL results in OFF state of the writing transistor TR$_W$ and floating state of the first node ND$_1$, namely the gate electrode of the driving transistor TR$_D$. On the other hand, the first transistor TR$_1$ maintains ON state, the drain area of the driving transistor TR$_1$) is in connection with the power source 2100 (voltage V$_{cc}$, e.g., 20 volts). Thus, as a result of the above, the potential of the second transistor TR$_2$ increases.

Now, as described above, the gate electrode of the driving transistor TR$_D$ is in floating state, and furthermore, because of the existence of the capacitor C$_1$, the same phenomenon as in so-called bootstrap circuit occurs in the gate electrode of the driving transistor TR$_D$, and also the potential of the first node ND$_1$ increases. As a result, the potential difference V$_{gs}$ between the gate electrode and source area of the driving transistor TR$_D$ maintains the value of equation (4).

And, the luminescence part ELP starts to be luminous because the potential of the second node ND$_2$ increases to be above (V$_{th-EL}$+V$_{Cat}$). At this point, the current flowing to the luminescence part ELP can be expressed by equation (1) because it is the drain current I$_{ds}$ flowing from the drain area of the driving transistor TR$_D$ to the source area of the driving transistor TR$_D$; where, from equation (1) and equation (4), equation (1) can be transformed into equation (5) below.

$$I_{ds} = k \cdot \mu \cdot (V_{Sig} - V_{Ofs} - \Delta V)^2 \quad (5)$$

Therefore, for example, if V$_{Ofs}$ is set to 0 volt, the current I$_{ds}$ flowing to the luminescence part ELP is proportional to the square of the value obtained by subtracting the value of the picture signal V$_{Sig}$ for controlling the luminance of the luminescence part ELP from the value of the potential adjustment value ΔV of the second node ND$_2$ (the source area of the driving transistor TR$_D$) resulted from the mobility µ of the driving transistor TR$_D$. In other words, the current I$_{ds}$ flowing to the luminescence part ELP does not depend on the threshold voltage V$_{th-EL}$ of the luminescence part ELP and the threshold voltage V$_{th}$ of the driving transistor TR$_D$; namely, the luminescence amount (luminance) of the luminescence part ELP is not affected by the threshold voltage V$_{th-EL}$ of the luminescence part ELP and the threshold voltage V$_{th}$ of the driving transistor TR$_D$. Then, the luminance of the (n, m) luminescence element is a value corresponding to this current I$_{ds}$.

Moreover, the value of Vgs on the left side of equation (4) because the larger mobility µ a driving transistor TR$_D$ has, the larger its potential adjustment value ΔV gets. Therefore, even if the value of the mobility µ is large in equation (5), the value of (V$_{Sig}$−V$_{Ofs}$−ΔV)$^2$ becomes small, and as a result, the drain current I$_{ds}$ can be adjusted. Thus, also if values of picture signal V$_{Sig}$s are the same amongst driving transistors TR$_D$s with different mobility µ, the drain currents I$_{ds}$s will be almost the same, and as aresult, the currents I$_{ds}$s flowing to the luminescence part ELP for controlling the luminance of the luminescence part ELP is uniformed. Thus, the variation of the luminance of the luminescence parts resulted from the variation of the mobility µ (and further, the variation of k) can be adjusted.

Luminous state of the luminescence part ELP is maintained until the (m+m'−1)-th horizontal scanning period. This time point corresponds to the end of [Period—TP(5)$_{-1}$].

Thus, the luminescence operation of the luminescence element 10 included in the (n, m) sub-pixel is done.

Next, an explanation related to a 2 Tr/1 C driving circuit will be provided.

[2 Tr/1 C Driving Circuit]

Figure 7:
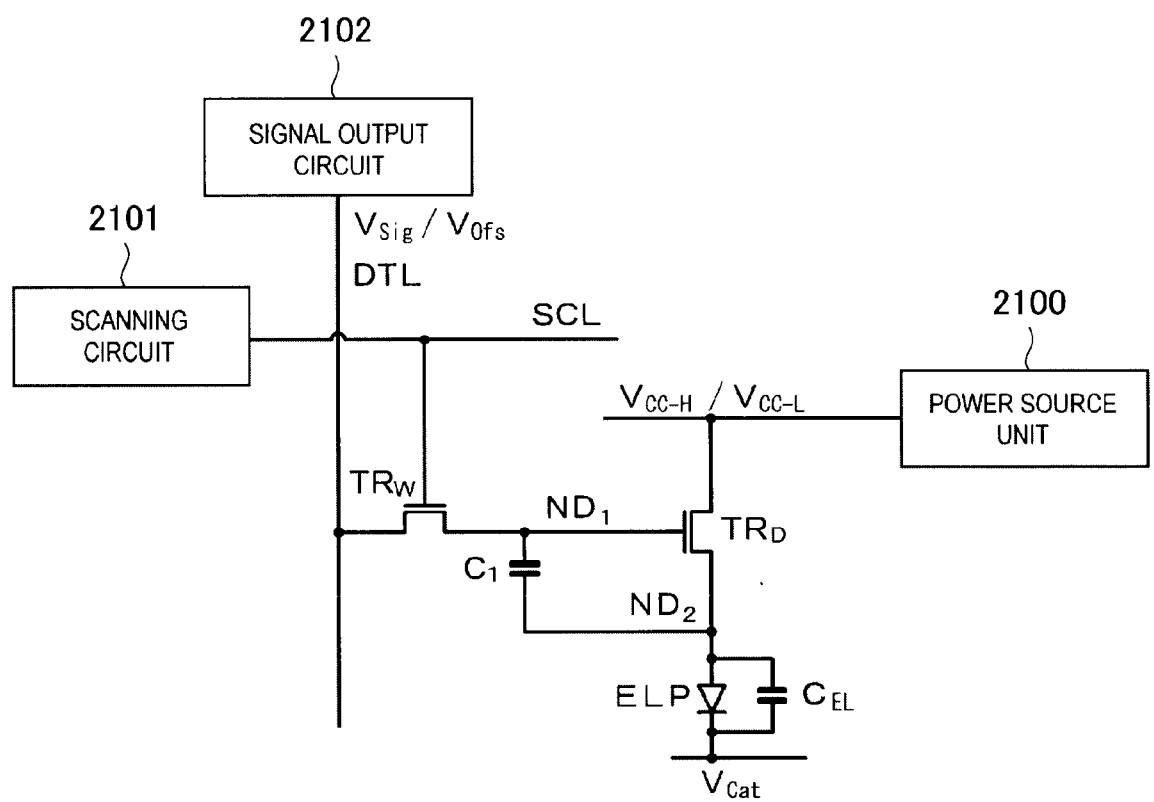
FIG. 7 is an equivalent circuit diagram for a 2 Tr/1 C driving circuit.
Figure 8:
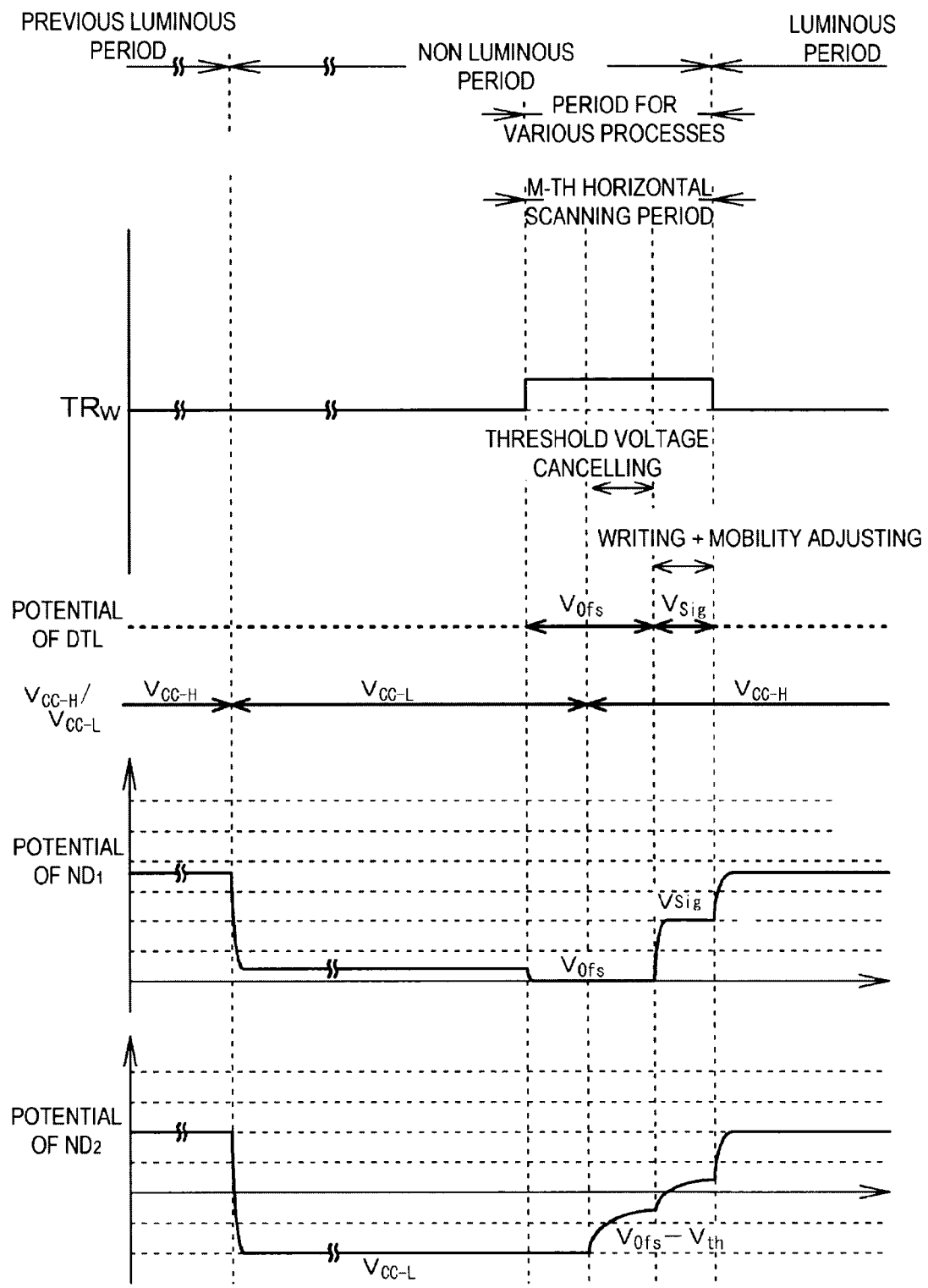
FIG. 8 is a timing chart for driving of the 2 Tr/1 C driving circuit.

An equivalent circuit diagram for a 2 Tr/1 C driving circuit is shown in FIG. 7, a timing chart for driving of the 2 Tr/1 C driving circuit is shown in FIG. 8, and on/off state of each of the transistors in the 2 Tr/1 C driving circuit, etc, is shown in each of FIG. 9A-9F.

For this 2 Tr/1 C driving circuit, three transistor, which are the first transistor TR$_1$, the second transistor TR$_2$, and the third transistor TR$_3$, are omitted from the 5 Tr/1 C driving circuit described above. In other words, this 2 Tr/1 C driving circuit includes two transistors, which are a writing transistor TR$_W$ and a driving transistor TR$_W$, and further includes one capacitor C$_1$.

[Driving Transistor TR$_D$]

Detailed explanation of the configuration the driving transistor TR$_D$ is omitted since it is the same as the configuration of the driving transistor TR$_D$ described with regard to the 5 Tr/1 C driving circuit. Now, the drain area of the driving transistor TR$_D$ is connected to the power source unit 2100. Besides, from the power source unit 2100, the voltage V$_{CC-H}$ for getting the luminescence part ELP luminous and the voltage V$_{CC-L}$ for controlling the potential of the source area of the driving transistor TR$_D$ are supplied. Here, the values of the voltages V$_{CC-H}$ and V$_{CC-L}$ could be:

$$V_{CC-H} = 20 \text{ volts};$$

$$V_{CC-L} = -10 \text{ volts},$$

though, they are not limited to these values.

[Writing Transistor TR$_W$]

Detailed explanation of the configuration the writing transistor TR$_W$ is omitted since it is the same as the configuration of the writing transistor TR$_W$ described with regard to the 5 Tr/1 C driving circuit.

Detailed explanation of the configuration the luminescence part ELP is omitted since it is the same as the configuration of the luminescence ELP described with regard to the 5 Tr/1 C driving circuit.

In the following, the operation of the 2 Tr/1 C driving circuit will be described.

Figure 9A:
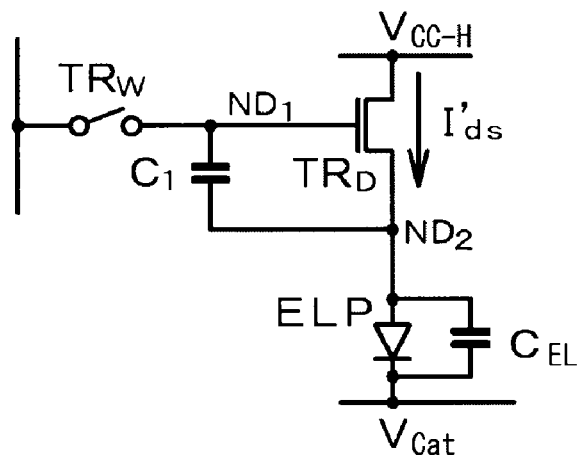
FIG. 9A is an illustration that shows ON/OFF state of each of the transistors in the 2 Tr/1 C driving circuit, etc.

[Period—TP(2)$_{-1}$] (see FIG. 8 and FIG. 9A)

This [Period—TP(2)$_{-1}$] is, for example, an operation in a previous display frame, and substantially the same operation as [Period—TP(5)$_{-1}$] described with regard to the 5 Tr/1 C driving circuit.

[Period—TP(2)$_0$]-[Period—TP(2)$_2$] shown in FIG. 8 are periods corresponding to [Period—TP(5)$_0$]-[Period—TP(5)$_4$] shown in FIG. 5, and operation periods until just before the next writing process is executed. Then, similarly to the 5 Tr/1 C driving circuit, for [Period—TP(2)$_0$]-[Period—TP(2)$_2$], the (n, m) luminescence element is in non luminous state, in principle. However, the operation of the 2 Tr/1 C driving circuit is different from the operation of the 5 Tr/1 C driving circuit in that [Period—TP(2)$_1$]-[Period—TP(2)$_2$] are included in the m-th horizontal scanning period in addition to [Period—TP(2)$_3$], as shown in FIG. 8. Besides, for the reason of simplicity of the explanation, the explanation will be provided with the assumption that the beginning of [Period—TP(2)$_1$] and the end of [Period—TP(2)$_3$] match the beginning and end of the m-th horizontal scanning period, respectively.

In the following, each period of [Period—TP(2)$_0$]-[Period—TP(2)$_2$] will be described. Besides, similarly as described with regard to the 5 Tr/1 C driving circuit, the length of each period of [Period—TP(2)$_1$]-[Period—TP(2)$_2$] can be optionally set according to the settings of a display device.

Figure 9B:
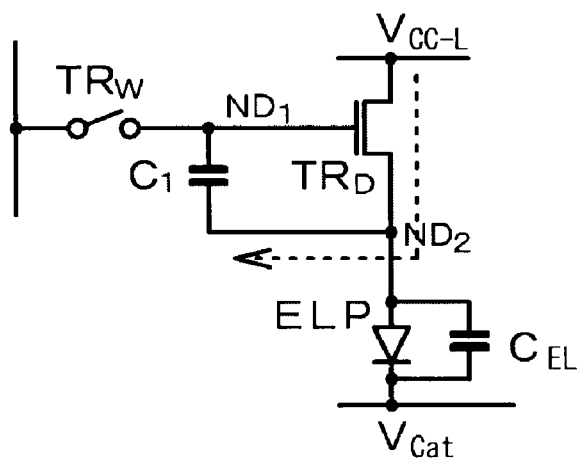
FIG. 9B is an illustration that shows ON/OFF state of each of the transistors in the 2 Tr/1 C driving circuit, etc.

[Period—TP(2)$_0$] (see FIG. 9B)

This [Period—TP(2)$_0$] is, for example, an operation from the previous display frame to the current display frame. In other words, this [Period—TP(2)$_0$] is a period from the (m+m')-th horizontal scanning period in the previous display frame to the (m−1)-th horizontal scanning period in the current display frame. Then, for this [Period—TP(2)$_0$], the (n, m) luminescence element is in non luminous state. Now, at the time point for transition from [Period—TP(2)$_{-1}$] to [Period—TP(2)$_0$], the voltage supplied from the power source unit 2100 is switched from $V_{CC-H}$ to voltage $V_{CC-L}$. As a result, the potential of the second node ND$_2$ is lowered to $V_{CC-L}$, and the luminescence part ELP gets into non luminous state. And, as the potential of the second node ND$_2$ gets lower, the potential of the first node ND$_1$ in floating state (the gate electrode of the driving transistor TR$_D$) is also lowered.

Figure 9C:
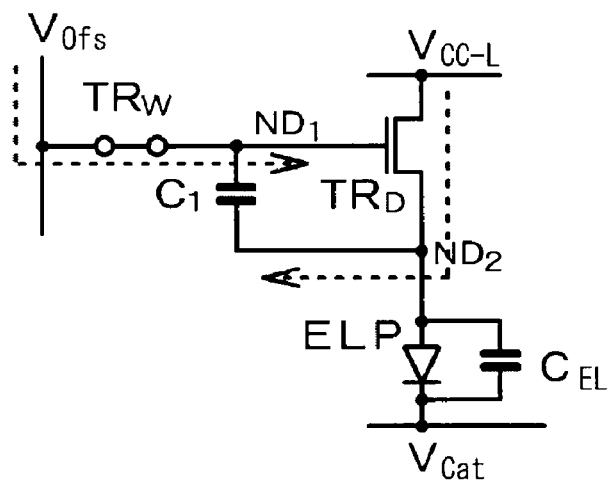
FIG. 9C is an illustration that shows ON/OFF state of each of the transistors in the 2 Tr/1 C driving circuit, etc.

[Period—TP(2)$_1$] (see FIG. 9C)

Then, the horizontal scanning period for the m-th row begins. For this [Period—TP(2)$_1$], a pre-process for executing the threshold voltage cancelling process is executed. At the beginning of [Period—TP(2)$_1$], the writing transistor TR$_W$ is got into ON state, by getting the scan line SCL to be at high level. As a result, the potential of the first node ND$_1$ becomes $V_{Ofs}$ (e.g., 0 volt). The potential of the second node ND$_2$ maintains $V_{CC-L}$ (e.g., −10 volts).

By the process above, the potential between the gate electrode and source area of the driving transistor TR$_D$ becomes above $V_{th}$, and the driving transistor TR$_D$ gets into ON state.

Figure 9D:
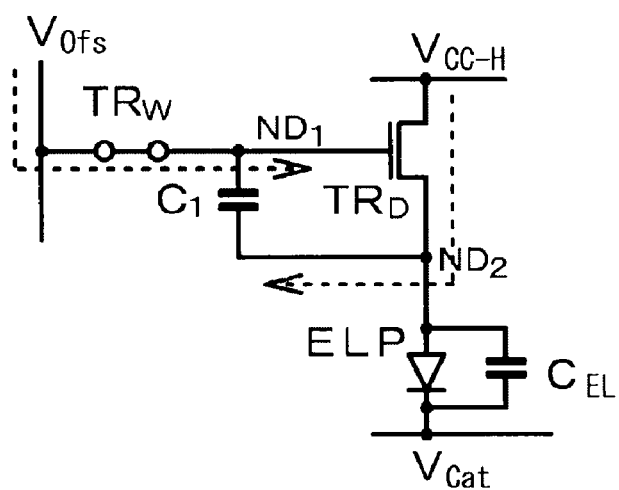
FIG. 9D is an illustration that shows ON/OFF state of each of the transistors in the 2 Tr/1 C driving circuit, etc.

[Period—TP(2)$_2$] (see FIG. 9D)

Next, the threshold voltage cancelling process is executed. Now, the voltage supplied from the power source unit 2100 is switched from $V_{CC-L}$ to voltage $V_{CC-H}$, with the writing transistor TR$_W$ maintained in ON state. As a result, the potential of the first node ND1 does not change ($V_{Ofs}$=0 volt maintained), whilst the potential of the second node ND$_2$ changes towards the potential obtained by subtracting the threshold voltage $V_{th}$ of the driving transistor TR$_D$ from the potential of the first node ND$_1$. In other words, the potential of the second node ND$_2$ in floating state increases. Then, when the potential difference between the gate electrode and source area of the driving transistor TR$_D$ reaches to $V_{th}$, the driving transistor TR$_D$ gets into OFF state. Specifically, the potential of the second node ND$_2$ in floating state approaches to ($V_{Ofs}$−$V_{th}$=−3 volts) to be ($V_{Ofs}$−$V_{th}$) in the end. Here, if equation (2) above is assured, in other words, if the potentials are selected and determined to satisfy equation (2), the luminescence part ELP will not be luminous.

For [Period—TP(2)$_3$], the potential of the second node ND$_2$ will be ($V_{Ofs}$−$V_{th}$) eventually. In other words, the potential of the second node ND$_2$ is determined, depending only on the threshold voltage $V_{th}$ of the driving transistor TR$_D$, and on the potential $V_{Ofs}$ for initialising the gate electrode of the driving transistor TR$_D$, and has no relationship with the threshold voltage $V_{th-EL}$ of the luminescence part ELP.

Figure 9E:
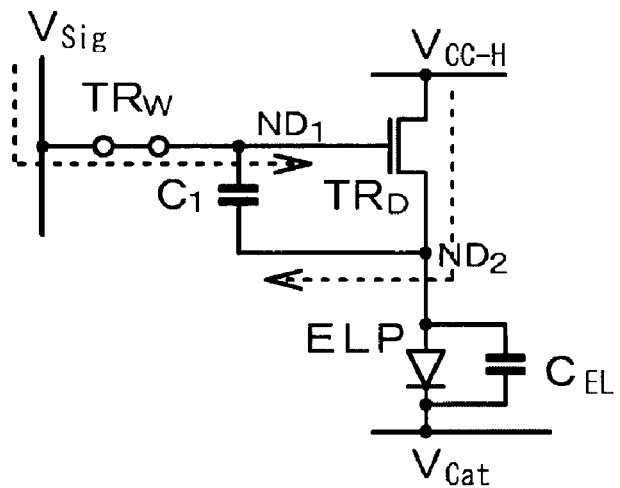
FIG. 9E is an illustration that shows ON/OFF state of each of the transistors in the 2 Tr/1 C driving circuit, etc.
Figure 9F:
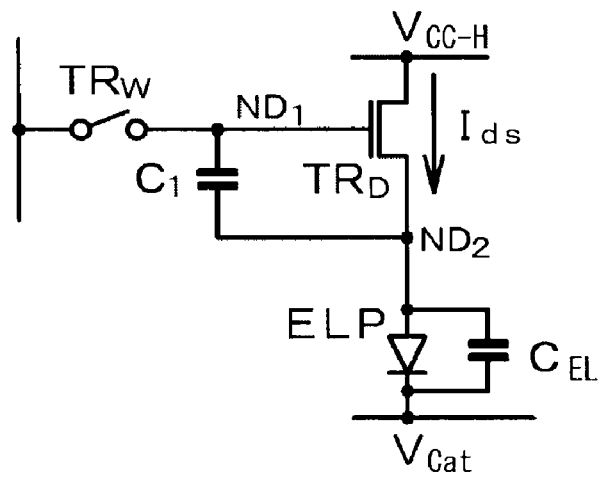
FIG. 9F is an illustration that shows ON/OFF state of each of the transistors in the 2 Tr/1 C driving circuit, etc.

[Period—TP(2)$_3$] (see FIG. 9E)

Next, the writing process for the driving transistor TR$_D$, and an adjustment (mobility adjustment process) on the potential of the source area of the driving transistor TR$_D$ (the second node ND$_2$) based on the magnitude of the mobility p of the driving transistor TR$_D$ are executed. Specifically, the data line DTL is made to be $V_{Sig}$ for controlling the luminance of the luminescence part ELP with the writing transistor TR$_W$ maintained in OFF state. As a result, the potential of the first node ND$_1$ increases to $V_{Sig}$, and the driving transistor TR$_D$ gets into ON state. Besides, the driving transistor TR$_D$ may be got into ON state by getting the writing transistor TR$_W$ into ON state by getting the writing transistor TR$_W$ into OFF state temporally, changing the potential of the data line DTL into a picture signal $V_{Sig}$ for controlling the luminance of the luminescence part ELP, and then getting the scan line SCL to be at high level.

Unlike the explanation for the 5 Tr/1 C, the potential of the source area of the driving transistor TR$_D$ increases since the voltage VCC-H is applied to the drain area of the driving transistor TR$_D$ by power source unit 2100. By getting the scan line SCL to be at low level after a predetermined time (t$_0$) has passed, the writing transistor TR$_W$ is got into OFF state, and the first node ND$_1$ (the gate electrode of the driving transistor TR$_D$) is got into floating state. Besides, And, the total time t$_0$ of [Period—TP(2)$_3$] is determined in advance as a configuration value during the configuration of a display device so that the potential of the second node ND$_2$ is ($V_{Ofs}$−$V_{th}$+ΔV).

Also for this [Period—TP(2)$_3$], if the value of the mobility μ of the driving transistor TR$_D$ is large, the increased amount ΔV of the potential of the source area of the driving transistor TR$_D$ is large, and if the value of the mobility μ of the driving transistor TR$_D$ is small, the increased amount ΔV of the potential of the source area of the driving transistor TR$_D$ is small.

[Period—TP(2)$_4$] (see FIG. 9E)

By the operations above, the threshold voltage cancelling process, the writing process, and the mobility adjusting process are done. Then, the same process as that for [Period—TP(5)$_7$] described with regard to the 5 Tr/1 C driving circuit is executed and the potential of the second node ND$_2$ increases to be above ($V_{th-EL}$+$V_{Cat}$), so that the luminescence part ELP starts to be luminous. At this point, the current flowing to the luminescence part ELP can be obtained by the above-mentioned equation (5), therefore, the current I$_{ds}$ flowing to the luminescence part ELP does not depend on the threshold voltage $V_{th-EL}$ of the luminescence part ELP and the threshold voltage $V_{th}$ of the driving transistor TR$_D$; namely, the luminescence amount (luminance) of the luminescence part ELP is not affected by the threshold voltage $V_{th-EL}$ of the luminescence part ELP and the threshold voltage $V_{th}$ of the driving transistor TR$_D$. Additionally, occurrence of the variation of the drain current Ids resulted from the variation of the mobility μ of the driving transistor TRD can be restrained.

Then, Luminous state of the luminescence part ELP is maintained until the (m+m'−1)-th horizontal scanning period. This time point corresponds to the end of [Period—TP(5)$_{-1}$].

Thus, the luminescence operation of the luminescence element 10 included in the (n, m) sub-pixel is done.

Figure 10:
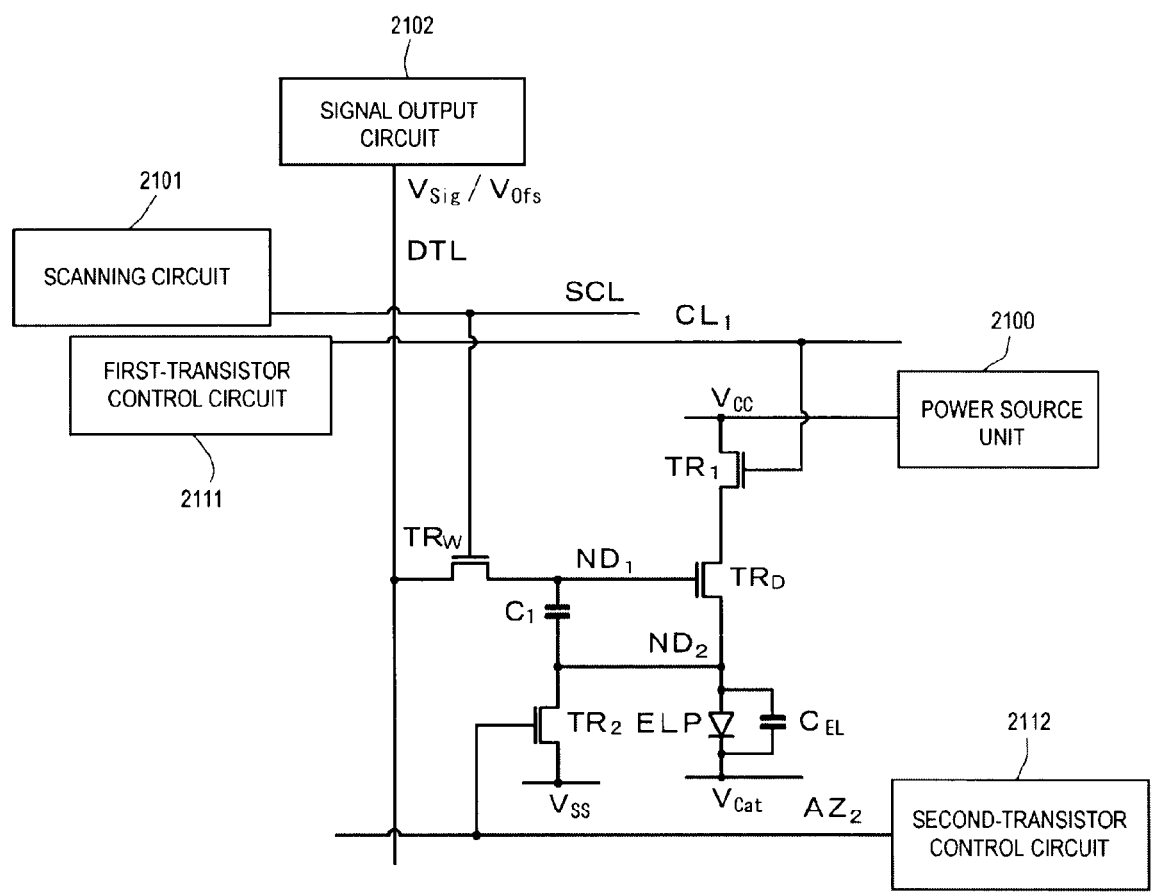
FIG. 10 is an equivalent circuit diagram for a 4 Tr/1 C driving circuit.
Figure 11:
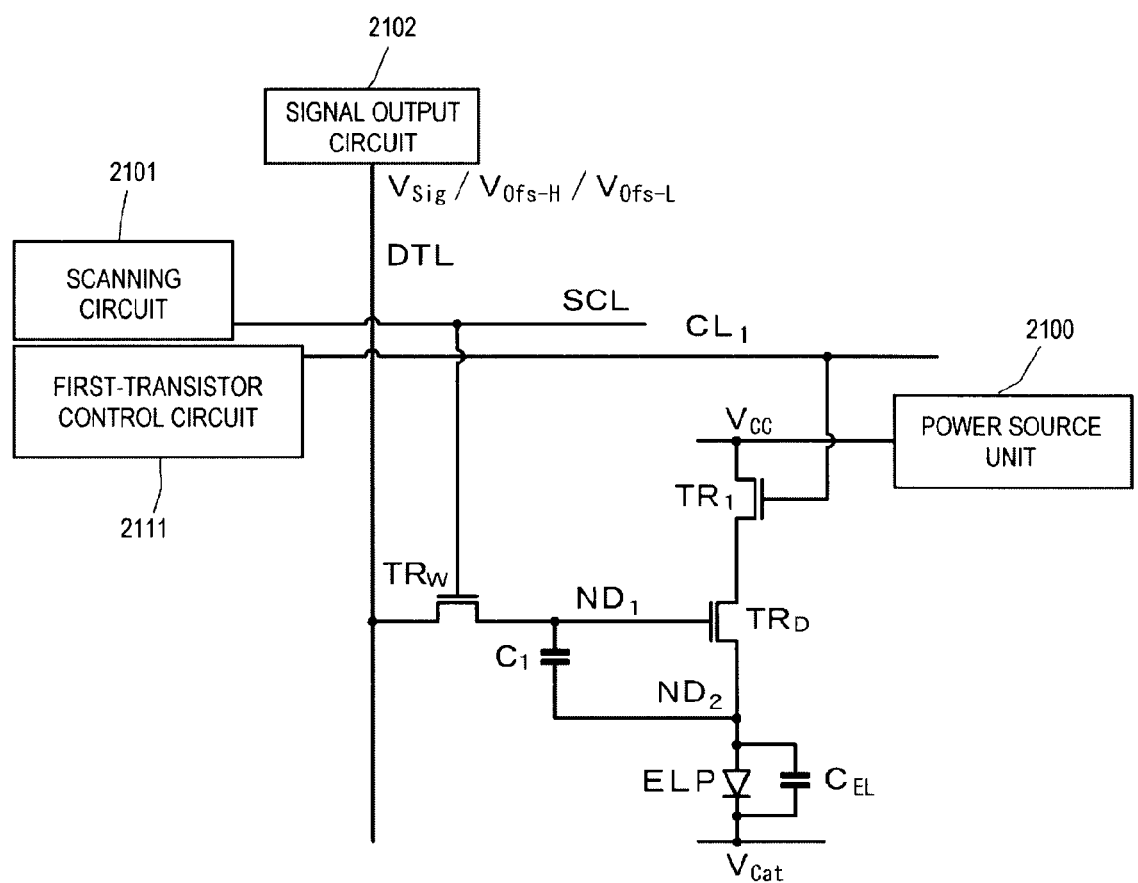
FIG. 11 is an equivalent circuit diagram for a 3 Tr/1 C driving circuit.

In the above, the explanation has provided based on the preferred examples, whilst the configuration of a driving circuit according to the present invention is not limited to these examples. The display device, the luminescence element, the configurations of various elements included in the driving circuit, the structure, the steps of the method of driving the luminescence part, which are described with regard to each example, are just for illustration, and can be modified optionally. For example, a 4 Tr/1 C driving circuit as shown in FIG. 10 and a 3 Tr/1 C driving circuit as shown in FIG. 11 may be used for the driving circuit.

And, although, in the operation explanation for the 5 Tr/1 C driving circuit, the writing process and the mobility adjustment are executed separately, they are not limited to such a case. Similarly to the operation explanation for the 2 Tr/1 C driving circuit, the mobility adjusting process can be configured to be executed along in conjunction with the writing process. Specifically, in such a configuration, a picture signal $V_{Sig\_m}$ is applied to the first node from the data line DTL via the writing transistor $T_{Sig}$ with the luminescence control transistor $T_{EL\_C}$ in ON state.

The long-term colour temperature adjuster 124 and elements associated with the long-term colour temperature adjuster 124, according to an embodiment of the present invention, will be described.

Figure 12:
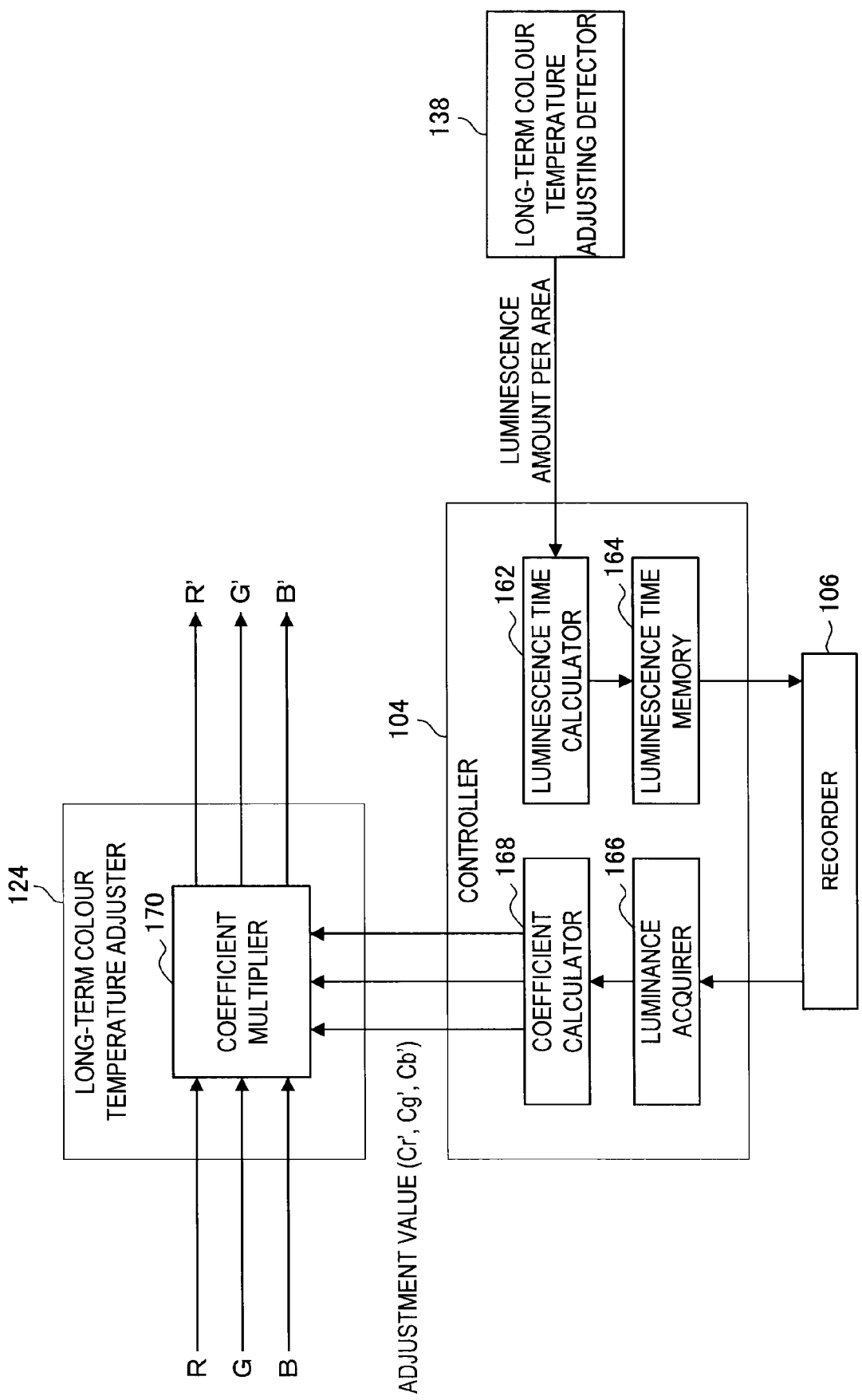
FIG. 12 is an illustration that illustrates the long-term colour temperature adjuster 124 and the components associated with the long-term colour temperature adjuster 124.

FIG. 12 is an illustration that illustrates the long-term colour temperature adjuster 124 and the components associated with the long-term colour temperature adjuster 124, according to an embodiment of the present invention. In the following, the long-term colour temperature adjuster 124 and the components associated with the long-term colour temperature adjuster 124, according to an embodiment of the present invention, will be described in detail with reference to FIG. 12.

The long-term colour temperature adjuster 124 inputs a picture signal corresponding to each colour of R, G, and B, and adjustment coefficients Cr', Cg', and Cb' sent from the controller 104, multiplies the picture signal corresponding to each colour of R, G, and B by a gain calculated from the adjustment coefficients Cr', Cg', and Cb' corresponding to each colour of R, G, and B, and outputs the picture signal (R', G', B') corresponding to each colour of R, G, and B after multiplied by the gain.

As shown in FIG. 12, the long-term colour temperature adjuster 124 includes a coefficient multiplier 170. The coefficient multiplier 170 multiplies the picture signal by the adjustment coefficients Cr', Cg', and Cb' calculated by a coefficient calculator 168, which will be described later, and outputs the multiplied picture signal (R', G', B') corresponding to each colour of R, G, and B.

The controller 104 inputs information on the luminescence amount for each colour of R, G, and B derived by the long-term colour temperature adjusting detector 138, which is an example of the luminescence amount detector of the present invention, and calculates the luminescence time for the organic EL elements in the panel 158 by use of the input luminescence amount. And, the controller 104 calculates the adjustment coefficients Cr', Cg', and Cb' for adjusting the picture signal corresponding to each colour of R, G, and B input into the long-term colour temperature adjuster 124, based on the calculated luminescence time.

The controller 104 includes a luminescence time calculator 162, a luminescence time memory 164, a luminance acquirer 166, and the coefficient calculator 168. In the following, the configuration of the controller 104 according to an embodiment of the present invention will be described.

The luminescence time calculator 162 calculates the luminescence time of an organic EL element from information on the luminescence amount of the organic EL element input from the long-term colour temperature adjusting detector 138. The information on the calculated luminescence time is sent to the luminescence time memory 164.

The luminescence time memory 164 is for temporarily storing the luminescence time calculated by the luminescence time calculator 162, and recording the stored luminescence time onto the recorder 106 at a predetermined interval. The recorder 106 is an example of the luminescence time recorder of the present invention.

The luminance acquirer 166 acquires luminance by use of the information on the luminescence time recorded in the recorder 106. The acquired luminance for each colour of R, G, and B is sent to the coefficient calculator 168.

The coefficient calculator 168 calculates the adjustment coefficients Cr', Cg', and Cb' by use of the luminance acquired by the luminance acquirer 166, and sends the calculated adjustment coefficients Cr', Cg', and Cb' to the long-term colour temperature adjuster 124.

In order to calculate the adjustment coefficients Cr', Cg', and Cb', the coefficient calculator 168 calculates them based on information on the relation between the luminescence time and the luminance of the organic EL elements (LT characteristic), which is recorded in the recorder 106 in advance. The information on the LT characteristic of the organic EL elements recorded in the recorder 106 may be stored in a form of a lookup table (LUT), for example.

Figure 13:
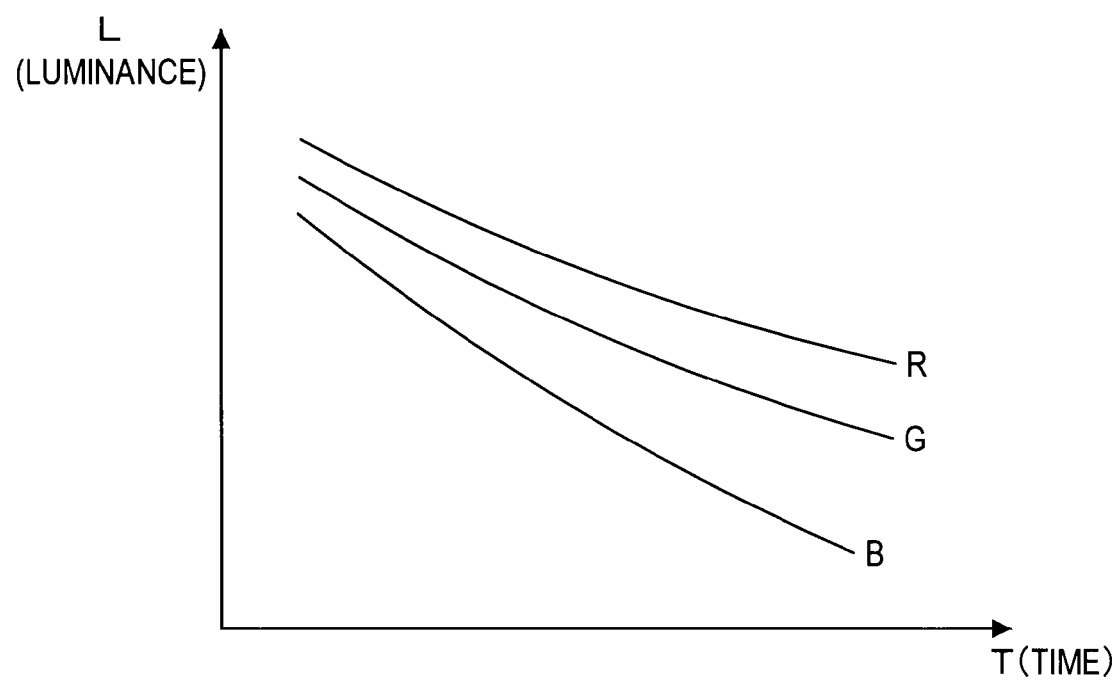
FIG. 13 is an illustration that illustrates an example of the LT characteristic of an organic EL element.
Figure 14A:
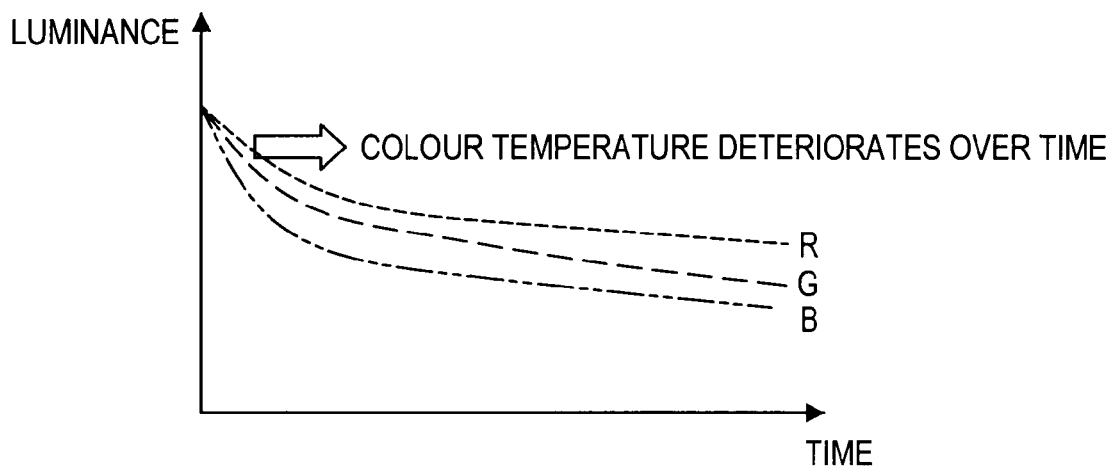
FIG. 14A is an illustration that illustrates an example of the LT characteristic of an organic EL element.
Figure 14B:
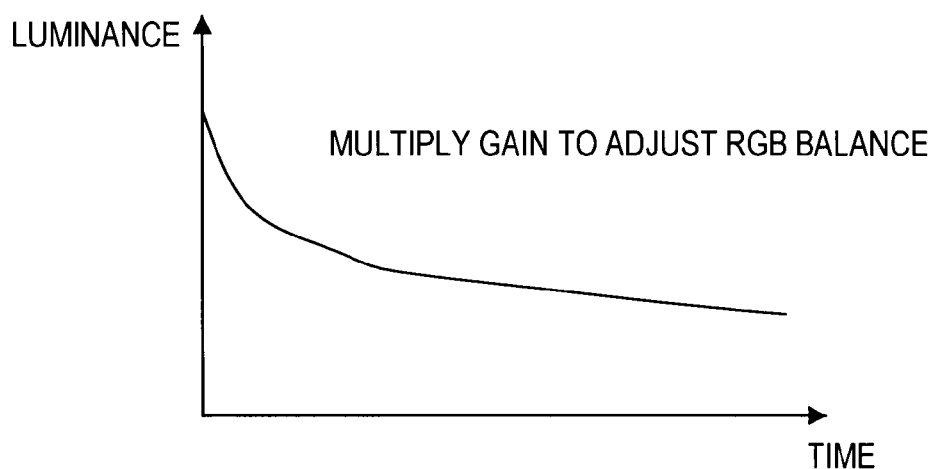
FIG. 14B is an illustration that illustrates an example of the LT characteristic of an organic EL element.

FIG. 13, FIG. 14A and FIG. 14B are illustrations that illustrate examples of the LT characteristic of the organic EL elements. As shown in FIG. 13, general organic EL elements do not have a uniform LT characteristic for each colour of R, G, and B, but have different LT characteristics for respective colours R, G, and B. In the LT characteristic shown in FIG. 13, deterioration in the luminance progresses over a luminescence time in the order of R to G to B.

Therefore, since the luminance of the light emitted by the organic EL element is known based on the luminescence time with regard to FIG. 13, the coefficient calculator 168 calculates an adjustment coefficient (gain) based on luminance information obtained from the luminescence time according to a colour at the lowest luminance.

In this embodiment, the information on the LT characteristics of the organic EL elements as shown in FIG. 13 is stored in the recorder 106 in advance. As shown in FIG. 14A, a luminescence time is derived from the luminescence amount corresponding to the respective colours input into the controller 104. The luminance acquirer 166 acquires luminance information corresponding to respective colours R, G, and B based on the derived luminescence time by use of the information on the LT characteristics stored in the recorder 106. The coefficient calculator 168 calculates a gain for adjusting the levels of the picture signal, using the luminance information for each colour of R, G, and B acquired by the luminance acquirer 166. In order to restrain the deterioration of the organic EL elements, the gain is desirably calculated adaptively to the colour at the most lowered luminance amongst the colours R, G, and B.

When the adjustment coefficients are calculated in such a manner, an image can be displayed without deteriorating its white balance. As shown in FIG. 14B, since the gains are calculated so that, to the colour at the lowest luminance, the luminance of the rest of the colours is adapted, the deterioration in the organic EL elements can be restrained.

In the above, the configuration of the controller 104 according to an embodiment of the present invention has been described.

The long-term colour temperature adjusting detector 138 inputs the picture signal and calculates the luminance for each colour of R, G, and B based on the input picture signal. In this embodiment, the luminance of one colour is calculated by use of the picture signal for one frame; namely, in order to calculate the luminance of three colours R, G, and B, the picture signals for three frames are to be input.

Figure 15:
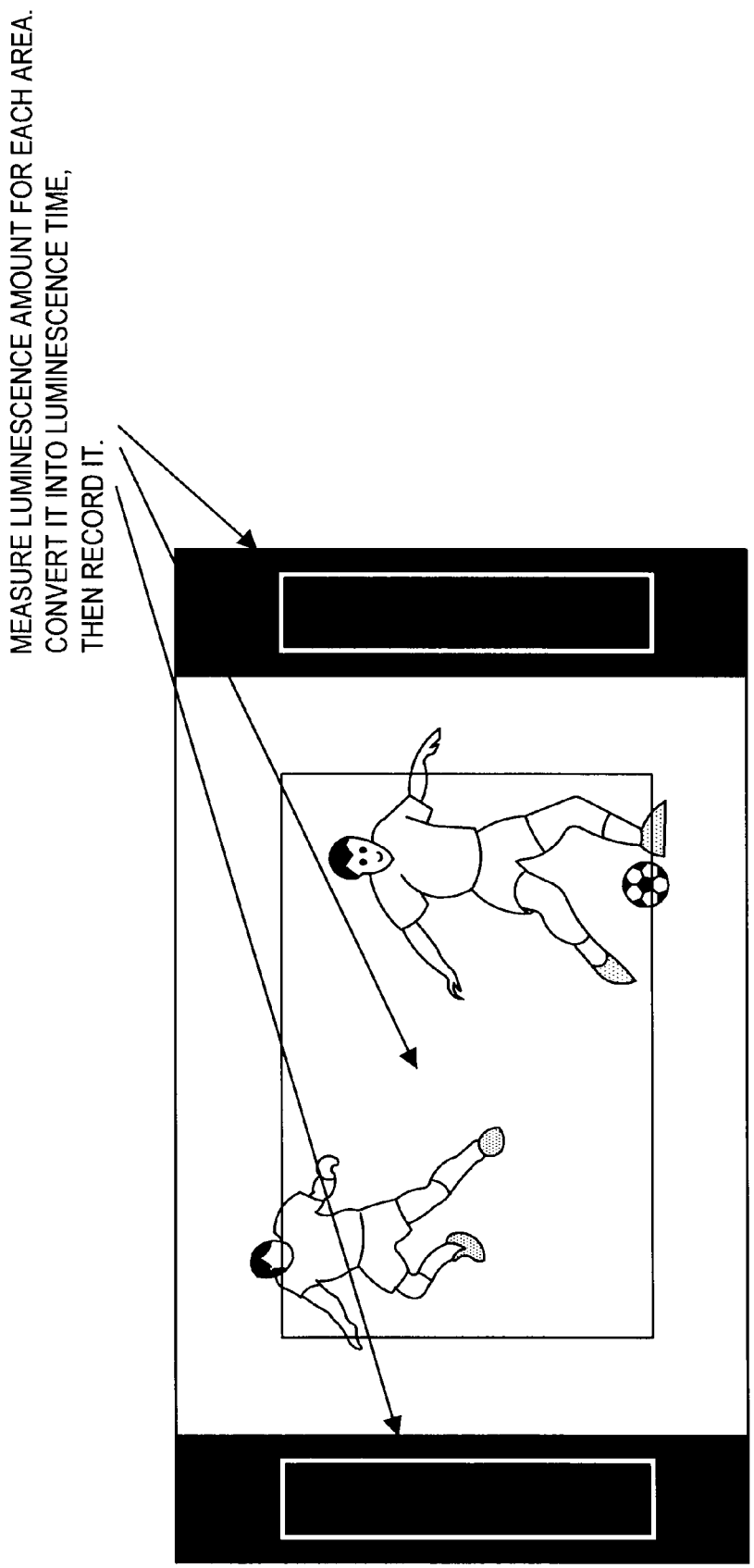
FIG. 15 is an illustration that shows areas on the screen to be divided in order to obtain luminance, according to an embodiment of the present invention.

The long-term colour temperature adjusting detector 138 divides the screen into a plurality of areas, and calculates average luminance in each area. FIG. 15 is an illustration that illustrates the areas on the screen which are divided for calculating luminance.

As shown in FIG. 15, in this embodiment, the long-term colour temperature adjusting detector 138 divides the screen into three areas, calculates the luminescence amount for each of R, G, and B in each of the areas, and sends the calculated luminescence amount to the controller 104. The controller 104 acquires a luminescence time based on the luminescence amount for each colour in each of the areas.

When the average luminance for each colour in each area is calculated in such a manner, upon calculation of the gain by the coefficient calculator 168, gains can be calculated not only on the basis of colours R, G, and B, but also for each area, in order to adjust colour temperature.

Besides, in this embodiment, the screen is divided into a plurality of areas, and the average luminance for each area is calculated. However, the present invention is not limited thereto, and the luminance may be calculated on a pixel basis, and the colour temperature may be adjusted, based on the luminance calculated on a pixel basis.

In the above, the long-term colour temperature adjuster 124 and the components associated with the long-term colour temperature adjuster 124 according to an embodiment of the present invention has been described. In the following, a colour temperature adjusting method according to an embodiment of the present invention will be described.

First, a picture signal is input into the long-term colour temperature adjusting detector 138. The picture signal input into the long-term colour temperature adjuster 138 is a picture signal which has passed through the signal level adjuster 128, and a signal by which a picture actually displayed on the panel 158.

Upon inputting the picture signal into the long-term colour temperature adjusting detector 138, the luminescence amount of respective colours R, G, and B is calculated on an area basis, based on the picture signal.

As described above, since the long-term colour temperature adjusting detector 138 can acquire luminance of one colour based on a picture signal for one frame, a picture signals for three frames are necessary for acquiring the luminance of the three colours R, G, and B. In this embodiment, since the screen is divided into three areas and the average value of the luminance for each colour in each area is calculated, a picture signal for nine frames is input in order to acquire the average values of all the colours in all the areas.

The organic EL elements have the current amount to be input and the luminescence amount in a linear relation, as described above. Furthermore, the organic EL elements have the current and the voltage in a linear relation. Therefore, when the level (voltage value) of the picture signal is detected, a luminescence amount according to the signal levels can be acquired.

The long-term colour temperature adjusting detector 138 calculates the average luminescence amount for each area, and sends the calculated average luminescence amount to the controller 104. The controller 104 acquires luminescence time from the information about the average luminescence amount for each area, and records it onto the recorder 106 so as to calculate the adjustment coefficients Cr', Cg', and Cb' based on information on the accumulated luminescence time for each colour in the organic EL elements.

In this embodiment, the adjustment coefficients Cr', Cg', and Cb' are calculated by use of information on the LT characteristic of the organic EL elements recorded in the recorder 106. Using the information on the LT characteristic of the organic EL elements enables deriving the luminance of the organic EL elements based on the information on the luminescence time for each colour of R, G, and B in each area. And, the adjustment coefficients for adjusting the picture signal are calculated based on the derived luminance of the organic EL elements.

In this embodiment, the calculated luminescence time is quantised. And, the quantised luminescence time is temporarily stored at a given interval (for example, interval of 1 minute), and recorded onto the recorder 106 at another given interval (for example, interval of 1 hour). When the luminance acquirer 166 acquires the luminance levels, it acquires the luminance levels for each colour of R, G, and B from the information on the luminescence time recorded in the recorder 106.

Upon acquiring the luminance level for each colour of R, G, and B by the luminance acquirer 166, the coefficient calculator 168 calculates the adjustment coefficients Cr', Cg', and Cb' for adjusting the signal levels of the picture signal.

The adjustment coefficients Cr', Cg', and Cb' calculated by the coefficient calculator 168 are sent from the controller 104 to the long-term colour temperature adjuster 124. The coefficient multiplier 170 multiplies the picture signal by the adjustment coefficients Cr', Cg', and Cb' calculated by the coefficient calculator 168, so that the long-term colour temperature adjuster 124 adjusts the levels of the picture signal.

The coefficient calculator 168 detects the lowest luminance level of the luminance levels of the adjustment coefficients Cr', Cg' and Cb', namely, of the respective colours R, G, and B, and calculates a gain for adapting, to a colour at the lowest luminance level, the luminance levels of the rest of the colours. For example, if the luminance level of R is the lowest in the acquired luminance levels of respective colours R, G, and B, a gain for adjusting the luminance levels of G and B to the luminance level of R is calculated.

Figure 16:
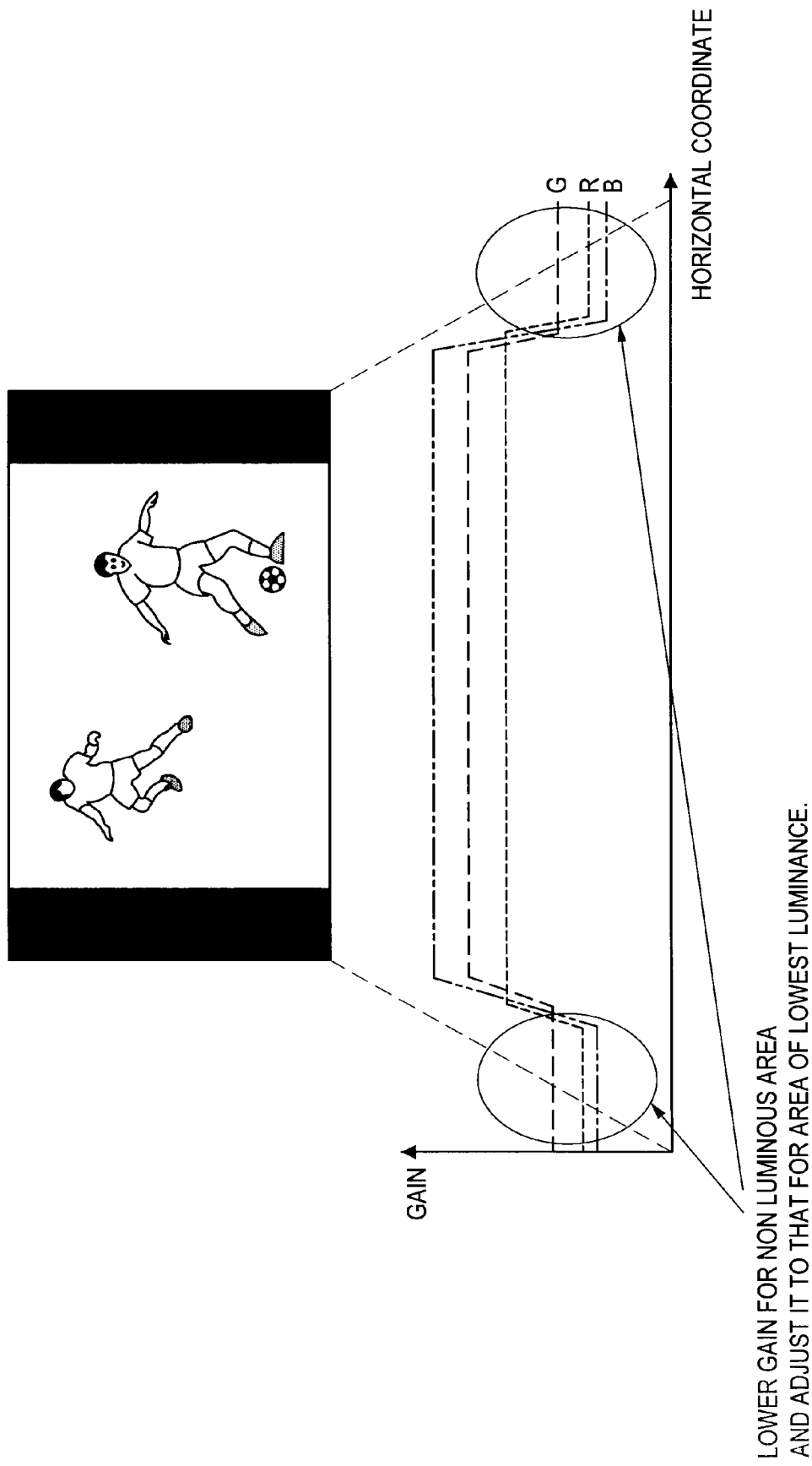
FIG. 16 is an illustration that graphically shows the relation between the horizontal coordinate and a gain, according to an embodiment of the present invention.

FIG. 16 is an illustration that graphically illustrates a relation between a horizontal coordinate of the screen and a gain, according to an embodiment of the present invention. As shown in FIG. 16, gains for non luminous areas are reduced to match the area with the lowest luminance.

The calculated gains are sent from the coefficient calculator 168 to the coefficient multiplier 170. Then, the coefficient multiplier 170 multiplies respective components of the colours R, G, and B of the picture signal by the gain, and adjusts the signal levels.

The colour temperature adjusting method according to an embodiment of the present invention will be specifically described with reference to the drawings.

Figure 17:
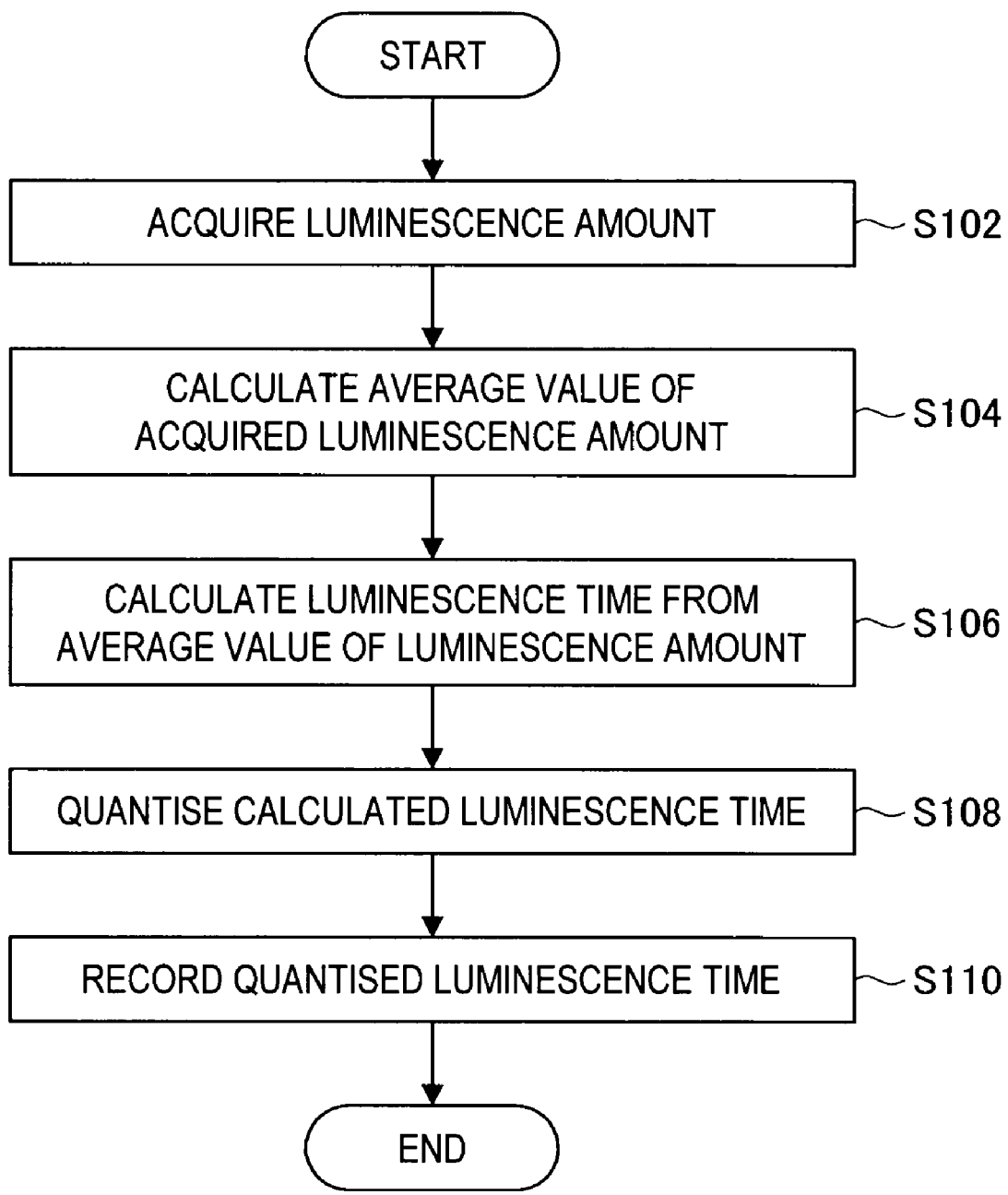
FIG. 17 is a flow diagram that illustrates a colour temperature adjusting method according to an embodiment of the present invention.

FIG. 17 and FIG. 19 are flow charts that illustrate the colour temperature adjusting method according to an embodiment of the present invention. FIG. 17 is a flow chart that illustrates the flow which begins with acquiring a luminescence amount to end with recording a luminescence time. FIG. 18 is a flow chart that illustrates the flow which begins with acquiring luminance from the luminescence time to end with multiplying the picture signal by a gain.

First, when a picture signal is input into the long-term colour temperature adjusting detector 138, it acquires the luminescence amount for each colour of R, G, and B from the input picture signal (step S102). Since the long-term colour temperature adjusting detector 138 can obtain luminance of one colour from a picture signal for one frame, picture signals for three frames are necessary for acquiring the luminance of three colours R, G, and B.

After the picture signals for three frames are input and data of the luminescence amount of a set of colours R, G, and B is acquired, the data of the luminescence amount of the next set of colours R, G, and B may be successively acquired, or may be acquired after a predetermined interval.

In this embodiment, after the data of the luminescence amount of the set of R, G and B is acquired, the data of the luminescence amount of the next set of R, G, and B is to be acquired after the time interval of three frames. Therefore, the interval at which the data of the luminescence amount is acquired is 6 V hours (=0.1 sec). Therefore, the 600 sets of data of the luminescence amount are acquired for 1 minute.

Upon acquiring a predetermined number of data of the luminescence amount by the long-term colour temperature adjusting detector 138, the data of the luminescence amount is sent from the long-term colour temperature adjusting detector 138 to the controller 104 via the I/F 114. The luminescence time calculator 162 receives the data of the luminescence amount, and calculates the average value of the luminescence amounts acquired by the luminescence time calculator 162 (step S104).

In this embodiment, if the data of the luminescence amount is acquired for one minute, namely, 600 sets of data of the luminescence amount are acquired, the average luminescence amount for 1 minute is calculated by use of the 600 sets of data of the luminescence amount.

Upon calculation the average luminescence amount by the luminescence time calculator 162, the luminescence time 162 subsequently calculates a luminescence time based on the calculated average luminescence amount (step S106). In this embodiment, the luminescence time is calculated based on the average luminescence amount for 1 minute. The luminescence time can be calculated as:

Luminescence time=average luminescence amount÷reference value, where, the reference value in this embodiment is a value corresponding to 200 cd/m2 in white overall and becomes 64 when a duty is 25%.

When the luminescence time is calculated, the calculated luminescence time is recorded in the recorder 106. In order to record it into the recorder 106, the calculated luminescence time is quantised at first (step S108). At the point of the quantisation, in order to record values on a 15 seconds basis with an integer part as "minute" and a decimal part as "second", the luminescence time is made fourfold to be rounded down with the fractional part omitted.

When the luminescence time is made to be fourfold to be rounded down with fractional part omitted, the luminescence time can be recorded in the recorder 106 with high accuracy. Besides, the present invention is not limited thereto, and the luminescence time may be recorded directly onto the recorder without any process.

Upon quantising the luminescence time, the quantised luminescence time is recorded onto the recorder 106 (step S110). The recording in the recorder 106 may be carried out every time of the quantisation, or otherwise, the quantised luminescence time may be stored temporarily to be then stored in the recorder 106 at a predetermined time interval.

Now, if the luminescence times are recorded every time of the quantisation, in some specifications of a memory adopted as the recorder 106, the number of recording times is likely to exceed the limit number of rewriting for the memory. In this embodiment, the quantised luminescence time is temporarily stored in the luminescence time memory 164, with the case of adopting such a memory as the recorder 106 taken into consideration. Then, it is desirable to record the luminescence time onto the recorder 106 from the luminescence time memory 164 at an interval longer than an interval at which an average luminescence amount is calculated. In this embodiment, the luminescence time is recorded in the recorder 106 from the luminescence time memory 164 at an interval of 1 hour. Of course, if the number of rewriting for the recorder 106 is not limited, luminescence times may be recorded onto the recorder 106 directly from the luminescence time calculator 162.

At the point of recording onto the recorder 106, the luminescence time is not overwritten but is saved so as to be accumulated. The information on the luminescence time recorded in the recorder 106 is read, and is added to the information of the luminescence time which is quantised, or which is quantised to be stored for a given time period, and then information on the luminescence time is recorded onto the recorder 106.

When the information on the luminescence time is accumulated in the recorder 106, the luminance for each colour of the organic EL elements can be derived by use of the information on the luminescence time and the information on the LT characteristic. Therefore, the luminance acquirer 166 derives the luminance for each colour of the organic EL elements by use of the information on the luminescence time accumulated in the recorder 106 (step S112).

Upon deriving the luminance for each colour of the organic EL elements by the luminance acquirer 166, the derived luminance for each colour is sent to the coefficient calculator 168. The coefficient calculator 168 calculates the adjustment coefficients based on the luminance of the respective colours (step S114), and outputs the calculated adjustment coefficients to the long-term colour temperature adjuster 124 (step S116). When the long-term colour temperature adjuster 124 receives the adjustment coefficients, the coefficient multiplier 170 multiplies the components of the respective colours R, G, and B of the picture signal by the adjustment coefficients calculated by the coefficient calculator 168 so as to adjust the signal levels (step S118).

The luminance levels of the respective colours R, G, and B obtained from the luminescence time of the organic EL elements derived by the luminance acquirer 166 are denoted by Yr, Yg, and Yb, respectively. Since life-time curves of the respective colours R, G, and B and the luminescence times for the respective colours R, G, and B are different from one another, the values of Yr, Yg, and Yb are different from one another.

Therefore, the lowest luminance level out of the respective luminance levels of Yr, Yg, and Yb of R, G, and B is calculated, and adjustment coefficients are calculated for adapting, to a colour at the lowest luminance level, the luminance levels of the rest of the colours.

Ymin=min (Yr, Yg, Yb)

Cr'=Ymin/Yr

Cg' =Ymin/Yg

Cb' =Ymin/Yb

Thus, the luminescence time is calculated from the information on the luminescence amount, and the luminance levels of the respective colours R, G, and B are derived from the calculated luminescence time. Then, the adjustment coefficients for uniforming the luminance levels of the respective colours R, G, and B are calculated, so that the colour temperature can be adjusted.

Figure 19A:
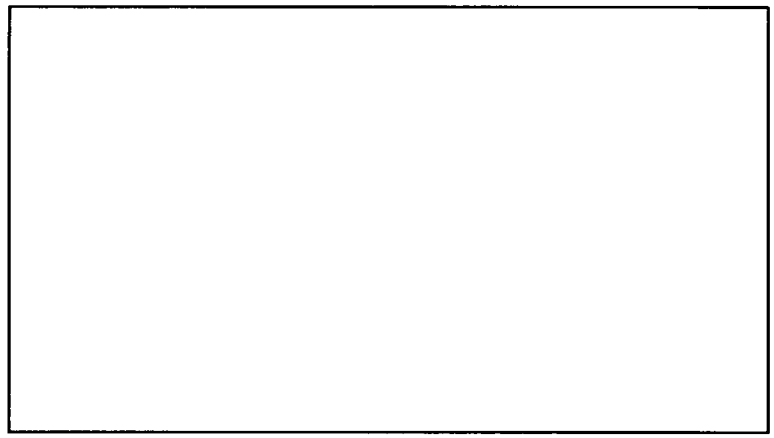
FIG. 19A is an illustration that illustrates adjustment on colour temperature according to an embodiment of the present invention.
Figure 19B:
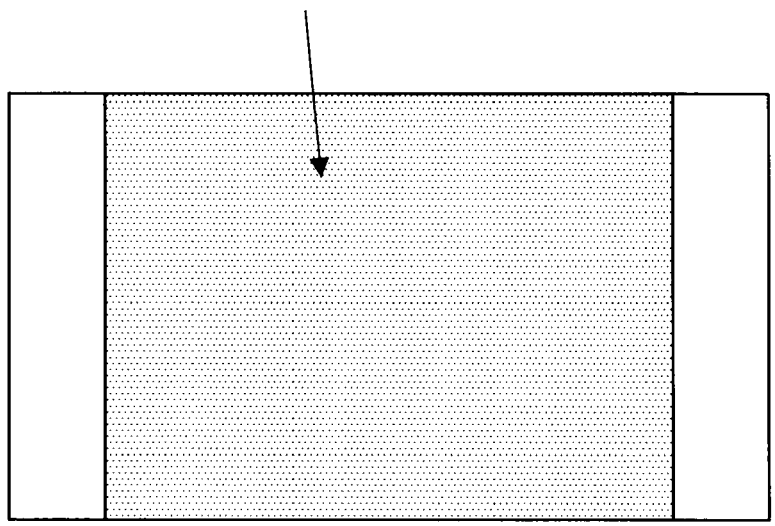
FIG. 19B is an illustration that illustrates adjustment on colour temperature according to an embodiment of the present invention.

FIG. 19A and FIG. 19B are illustrations that illustrate adjustment on colour temperature according to an embodiment of the present invention.

As shown in FIG. 19A, the display device 100 according to this embodiment can display a picture at a ratio of 16:9 (960 dots in latitude, 540 dots in longitude) with respect to the longitude and latitude on the panel. However, pictures at a ratio of 4:3 still exist in television broadcasting. When such pictures are displayed on the display device 100 according to this embodiment, the pictures are displayed only in the middle, where both right and left sides of the screen are in black with no picture displayed.

Therefore, as shown in FIG. 19B, when a picture at a ratio of 4:3 with respect to the longitude and latitude is continuously displayed on the display device 100, the middle will be particularly deteriorated in comparison with both sides, which are in black.

Thus, if a picture at a ratio of 4:3 with respect to the longitude and latitude is continuously displayed on the display device 100 resulting in the deteriorated luminescence characteristic of the middle, the luminance of both right and left sides of the screen may be adjusted to the luminance of the middle of the screen, or otherwise, the entire screen may be adjusted so that the luminance of the middle of the screen is adapted to a colour at the most lowered luminance level.

Also, in this embodiment, a detecting area on the screen for detecting a luminescence amount is 512 lines ($512=2^9$) in longitude. On the other hand, there are 540 lines in longitude on the panel. Therefore, in the case where a luminescence amount is detected, the detecting area may be moved up and down as the time passes.

Figure 20:
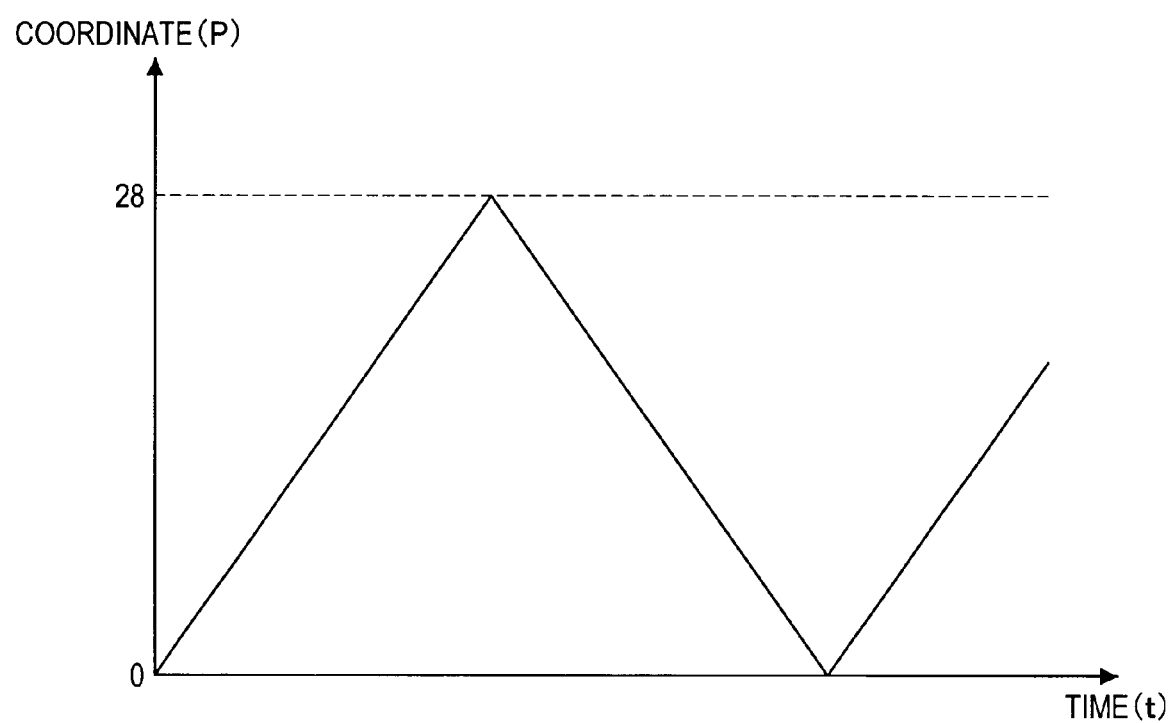
FIG. 20 is an illustration that graphically shows the relation between the time and a detection area.

FIG. 20 is an illustration that graphically illustrates the relation between the time and a detecting area, according to an embodiment of the present invention. The abscissa represents the time (t), and the ordinate represents a coordinate of a starting line at the upper end of the detecting area with reference to the top of the panel.

If the time (t) is 0, the luminescence amount is detected with the 512 lines in longitude from the top on the panel taken as a detecting area. Then, the upper end of the detecting area is gradually lowered over time, and when the upper end of the detecting area reaches the 28th line, the upper end of the detecting area is then gradually lowered. Thus, by moving the detecting area up and down over time, the luminescence amounts can be acquired all over the screen.

Besides, the slope of the straight line in the graph shown in FIG. 20, namely, the moving amount of the detecting area over time may be a fixed value or a variable. In the case of a variable, the moving amount may be released as a parameter to be allowed setting externally.

In the above, the colour temperature adjusting method according to an embodiment of the present invention has been described. The colour temperature adjusting method according to an embodiment of the present invention may be performed by executing a computer program which is provided in order to perform the colour temperature adjusting method according to an embodiment of the present invention. Such programs are recorded in advance in a recording medium (e.g., the recorder 106) within the display device 100, and are sequentially read to be executed by an operating device (e.g., the controller 104).

As described above, according to an embodiment of the present invention, the luminescence amount of organic EL elements is acquired from a picture signal, a luminescence time is calculated from the acquired luminescence amount, so that the luminance levels of the respective colours R, G, and B can be calculated from information of the calculated luminescence time. Then, a gain is calculated so as to adjust to a colour at the lowest luminance level in the calculated luminance levels of respective colours R, G, and B, and colour temperature is adjusted by multiplying the picture signal by the calculated gain, so that the deterioration in white balance of an image displayed on a screen via the panel in the display device 100 can be prevented.

Also, according to an embodiment of the present invention, since the respective luminance levels of the colours R, G, and B can be calculated from the levels of the picture signal with a linear characteristic. For this reason, even if information on the luminance level for each colour of R, G, and B actually illuminated by the panel 158 is not acquired, the luminance level for each colour of R, G, and B is acquired, so that the colour temperature can be adjusted. Moreover, various signal processes to be executed on the picture signal with a linear characteristic may be done by simple operations, and thus a simple configuration will do for the circuits for performing the operations, which results in the reduced area for the whole circuits and a thinner and lighter display device 100.

It should be understood by those skilled in the art that various modifications, combinations, sub-combinations and alternations may occur depending on design requirements and other factors insofar as they are within the scope of the appended claims or the equivalents thereof.

For example, in this embodiment, the luminance acquirer 166 provided inside the controller 104 acquires the luminance based on the luminescence time and LUT recorded in the recorder 106, and the coefficient calculator 168 calculates the adjustment coefficients Cr', Cg', and Cb' from the acquired luminance. Then the calculated adjustment coefficients are sent to the long-term colour temperature adjuster 124, and the coefficient multiplier 170 provided inside the long-term colour temperature adjuster 124 multiplies the picture signal by the coefficients. However, the present invention is not limited to thereto. For example, in the controller 104, the luminance levels of respective colours R, G and B may be acquired, and the acquired luminance levels may be sent to the long-term colour temperature adjuster 124. And then, the long-term colour temperature adjuster 124 may calculate the adjustment coefficients Cr', Cg', and Cb'.

The invention claimed is:

1. A display device including a display unit having pixels, each of which includes a luminescence element for individually emitting light depending on a current amount and a pixel circuit for controlling a current applied to the luminescence element according to a picture signal, scan lines which supply a selection signal for selecting the pixels to emit light to the pixels in a predetermined scanning cycle, and data lines which supply the picture signal to the pixels, the pixels, the scan lines, and the data lines arranged in a matrix pattern, the display device comprising:

a luminescence amount detector for inputting a picture signal with a linear characteristic to detect a luminescence amount from the picture signal;

a luminescence time calculator for calculating a luminescence time for the luminescence element based on the luminescence amount detected by the luminescence amount detector;

a luminescence time recorder for recording the calculated luminescence time;

a luminance acquirer for acquiring luminance information of the luminescence element by use of the luminescence time recorded in the luminescence time recorder;

a coefficient calculator for calculating a coefficient by which the picture signal is multiplied, based on the luminance information acquired by the luminance acquirer; and a coefficient multiplier for multiplying the picture signal by the coefficient calculated by the coefficient calculator;

wherein the coefficient calculator calculates a coefficient for adjusting, to luminance of a colour at lowest luminance, luminance of other colours, as a result of acquiring the luminance information by the luminance acquirer.

2. The display device according to claim 1, further comprising a linear converter for converting a picture signal with a gamma characteristic into the picture signal with the linear characteristic.

3. The display device according to claim 1, further comprising a gamma converter for converting an output signal with a linear characteristic from the coefficient multiplier to be with a gamma characteristic.

4. The display device according to claim 1,
wherein the luminescence amount detector detects luminescence amounts for a plurality of areas on the screen, and
wherein the display device further comprises a signal level calculator for adjusting a luminescence amount adapting to an area with most lowered luminance.

5. The display device according to claim 4, wherein, in a case of detecting a luminescence amount, the luminescence amount detector moves an area up and down for the plurality of areas on the screen to detect a luminescence amount.

6. A method of driving a display device including a display unit having pixels, each of which includes a luminescence element for individually emitting light depending on a current amount and a pixel circuit for controlling a current applied to the luminescence element according to a picture signal, scan lines which supply a selection signal for selecting the pixels to emit light to the pixels in a predetermined scanning cycle, and data lines which supply the picture signal to the pixels, the pixels, the scan lines, and the data lines arranged in a matrix pattern, the method of driving the display device, comprising:
a luminescence amount detecting step of inputting a picture signal with a linear characteristic to detect a luminescence amount from the picture signal;
a luminescence time calculating step of calculating a luminescence time for the luminescence element based on the luminescence amount detected in the luminescence amount detecting step;
a luminescence time recording step of recording the calculated luminescence time;
a luminance acquiring step of acquiring luminance information of the luminescence element by use of the luminescence time recorded in the luminescence time recording step;
a coefficient calculating step of calculating a coefficient by which the picture signal is multiplied, based on the luminance information acquired in the luminance acquiring step; and
a coefficient multiplying step of multiplying the picture signal by the coefficient calculated in the coefficient calculating step;
wherein the coefficient calculating step calculates a coefficient for adjusting, to luminance of a colour at lowest luminance, luminance of other colours, as a result of acquiring the luminance information in the luminance acquiring step.

7. The method of driving the display device, according to claim 6, further comprising a linear converting step of converting a picture signal with a gamma characteristic into the picture signal with the linear characteristic.

8. The method of driving the display device, according to claim 6, further comprising the step of converting an output signal with a linear characteristic in the coefficient multiplying step to be with a gamma characteristic.

9. The method of driving the display device, according to claim 6,
wherein the luminescence amount detecting step detects luminescence amounts for a plurality of areas on the screen, and
wherein the method of driving the display device further comprises a signal level calculating step of adjusting a luminescence amount adapting to an area with most lowered luminance.

10. The method of driving the display device, according to claim 9, wherein, in a case of detecting a luminescence amount, the luminescence amount detecting step moves an area up and down for the plurality of regions on the screen to detect a luminescence amount.

11. A non-transitory computer readable medium storing a computer program for causing a computer to execute control over a display device including a display unit having pixels, each of which includes a luminescence element for individually emitting light depending on a current amount and a pixel circuit for controlling a current applied to the luminescence element according to a picture signal, scan lines which supply a selection signal for selecting the pixels to emit light to the pixels in a predetermined scanning cycle, and data lines which supply the picture signal to the pixels, the pixels, the scan lines, and the data lines arranged in a matrix pattern, the computer program comprising:
a luminescence amount detecting step of inputting a picture signal with a linear characteristic to detect a luminescence amount from the picture signal;
a luminescence time calculating step of calculating a luminescence time for the luminescence element based on the luminescence amount detected in the luminescence amount detecting step;
a luminescence time recording step of recording the calculated luminescence time;
a luminance acquiring step of acquiring luminance information of the luminescence element by use of the luminescence time recorded in the luminescence time recording step;
a coefficient calculating step of calculating a coefficient by which the picture signal is multiplied, based on the luminance information acquired in the luminance acquiring step; and
a coefficient multiplying step of multiplying the picture signal by the coefficient calculated in the coefficient calculating step;
wherein the coefficient calculating step calculates a coefficient for adjusting, to luminance of a colour at lowest luminance, luminance of other colours, as a result of acquiring the luminance information in the luminance acquiring step.

* * * * *